(12) United States Patent
Inoue et al.

(10) Patent No.: US 7,483,608 B2
(45) Date of Patent: Jan. 27, 2009

(54) METHOD OF DESIGNING OPTICAL PULSE SHAPING DEVICE AND OPTICAL PULSE SHAPING DEVICE

(75) Inventors: Takashi Inoue, Tokyo (JP); Shu Namiki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/593,340

(22) PCT Filed: Mar. 17, 2005

(86) PCT No.: PCT/JP2005/004837

§ 371 (c)(1),
(2), (4) Date: Jul. 11, 2007

(87) PCT Pub. No.: WO2005/091065

PCT Pub. Date: Sep. 29, 2005

(65) Prior Publication Data

US 2007/0280613 A1    Dec. 6, 2007

(30) Foreign Application Priority Data

Mar. 19, 2004  (JP) .............................. 2004-081396

(51) Int. Cl.
*G02B 6/00*  (2006.01)
(52) U.S. Cl. .................................................... 385/122
(58) Field of Classification Search .................. 385/122
See application file for complete search history.

(56) References Cited

U.S. PATENT DOCUMENTS

| 6,522,818 | B1 | 2/2003 | Aso et al. | |
|---|---|---|---|---|
| 6,892,015 | B2 * | 5/2005 | Tadakuma et al. | .......... 385/122 |
| 2002/0164135 | A1 | 11/2002 | Tadakuma et al. | |

FOREIGN PATENT DOCUMENTS

| JP | 2000-347228 | 12/2000 |
|---|---|---|
| JP | 2002-229080 | 8/2002 |

OTHER PUBLICATIONS

Takashi Inoue, et al., "Stationary Rescaled Pulse Denpan ni Motozuku Comb-like Profiled Fiber Sekkei to Pulse Asshuku Jikken", Denshi Joho Tsushin Gakkai Koen Ronbunshu, Electronics, Mar. 7, 2005, p. 338.

(Continued)

*Primary Examiner*—Michelle R. Connelly-Cushwa
*Assistant Examiner*—Chris Chu
(74) *Attorney, Agent, or Firm*—Oblon, Spivak, McClelland, Maier & Neustadt, P.C.

(57) ABSTRACT

The present invention provides a method for designing an optical pulse shaper including a first optical propagation line unit having a nonlinear medium and a dispersion medium concatenated, including: specifying design specifications of the first optical propagation line unit; and based on the design specification, calculating a quasi-periodic stationary pulse of which a waveform of an input optical pulse to the first optical propagation line unit is similar to a waveform of an output pulse from the first optical propagation line unit.

24 Claims, 13 Drawing Sheets

OTHER PUBLICATIONS

M. J. Guy, et al., "A novel optical pulse compressor with use of a comb-like dispersion profiled fiber", CLEO'97, p. 178.

S. V. Chernikov, et al., "Integrated all Optical Fibre Source of Multigigahertz soliton pulse train", Electronics Letters, vol. 29, No. 20, Sep. 30, 1993, pp. 1788-1789.

S. V. Chernikov, et al., "Comblike dispersion-profiled fiber for soliton pulse train generation", Optics Letters, vol. 19, No. 8, Apr. 15, 1994, pp. 539-541.

Akira Hasegawa, et al., "Guiding-center soliton in optical fibers", Optics Letters, vol. 15, No. 24, Dec. 15, 1990, pp. 1443-1445.

Mark J. Ablowitz, et al., "Multiscale pulse dynamics in communication systems with strong dispersion management", Optics Letters, vol. 23, No. 21, Nov. 1, 1998, pp. 1668-1670.

J. H. B. Nijhof, et al., "The Averaging Method for Finding Exactly Periodic Dispersion-Managed Solitons", IEEE Journal of Selected Topics in Quantum Electronics, vol. 6, No. 2, Mar./Apr. 2000, pp. 330-336.

N. J. Smith, et al., "Enhanced power solitons in optical fibres with periodic dispersion management", Electronics Letters, vol. 32, No. 1, Jan. 4, 1996, pp. 54-55.

C. P. Agrawal, "Nonlinear Fiber Optics", Academic Press, $3^{rd}$ Edition, 2001, pp. 98-101.

K. Igarashi, et al., "Wideband-tunable highly pure 40 GHz picosecond soliton train generation by short comb-like profiled fiber", CLEO2004, May 2004, 3 pages.

Toshihiko Hirooka, et al., "Parabolic pulse generation by use of a dispersion-decreasing fiber with normal group-velocity dispersion", Optics Letters, vol. 29, No. 5, Mar. 1, 2004, pp. 498-500.

M. E. Fermann, "Self-Similar Propagation and Amplification of Parabolic Pulses in Optical Fibers", Physical Review Letters, vol. 84, No. 26, Jun. 26, 2000, pp. 6010-6013.

Siddharth Ramachandran, "Dispersion Management with Higher Order Mode Fibers" Acta Optica Sinica, vol. 23, Oct. 2003, pp. 568-569.

* cited by examiner 3-step pulse shaper
4-step pulse shaper of the present invention

METHOD OF DESIGNING OPTICAL PULSE SHAPING DEVICE AND OPTICAL PULSE SHAPING DEVICE

TECHNICAL FIELD

The present invention relates to an optical pulse shaper and a method for designing the optical pulse shaper that are applicable to optical pulse generating techniques used in an optical fiber communication system, or applicable to optical pulse generating techniques used for materials processing purposes.

BACKGROUND INVENTION

Recently, there has been a rapidly increasing importance of an optical pulse shaper for generating and outputting ultra-short optical pulses.

In the area of optical communications, with use of a system in which a bit rate of each channel exceeds 40 Gb/s, a repetition frequency is substantially high, and accordingly, optical pulses are required to have high quality, less noise, less jitter and the like. In addition, when a relay unit is inserted into an optical propagation line, it is required to generate local clock pulse trains for a function of optical signal regeneration to recover from waveform-deteriorated optical pulses caused during propagation. In other words, it is necessary to generate, under a high repetition frequency of more than 40 GHz, ultra-short optical pulse trains having an improved repetition characteristic, a pulse waveform of high quality and a very short pulse width.

Meanwhile, the area of optical processing makes use of a multi-photon absorption process using an optical pulse having a width of femtosecond order, and it is expected to realize a method of such processing that could not be obtained conventionally.

In addition, the conventional ultra-short pulse generating techniques are roughly classified into a technique using a cavity structure and a technique using no cavity structure.

In the ultra-short pulse generating technique using a cavity structure, a solid-state laser such as Ti: Sapphire Laser, a mode synchronization fiber laser having a cavity structure configured by the optical fiber itself, a semiconductor mode synchronization laser having a mode synchronization structure configured by a semiconductor or the like are used.

On the other hand, the ultra-short pulse generating technique using no cavity structure utilizes such a phenomenon that an optical pulse as a seed signal is compressed by the nonlinear effect in an optical fiber. As no cavity structure is used, the technique is called "traveling wave (TW) system", and an optical soliton compressor, a super continuum compressor and the like are known.

According to the ultra-short pulse generating technique using a cavity structure, as the repetition frequency is determined by the cavity length, flexibility as to the repetition frequency is small. Further, for continuous pulse oscillation, various stabilization techniques are required and fine adjustment is required in accordance with change in the external environment.

On the other hand, according to the ultra-short pulse generating technique using no cavity structure (particularly, the ultra-short pulse generating technique based on the TW system using an optical fiber), as the width of an optical pulse, beat light or the like, which is a seed signal, generated from an electric circuit is compressed, the repetition frequency is tunable. Further, as no cavity structure is used, it is possible to output an optical pulse of extremely high stability in accordance with the stability of an optical fiber itself.

Here, known as the compression of an optical pulse width by TW system are SC compression and optical soliton compression.

SC compression is of compressing an optical pulse width by broadening the frequency band of the optical pulse by the nonlinear effect of an optical fiber of small dispersion and then compensating dispersion of the broadened frequency band. In order to perform this SC compression efficiently, it is preferable that the optical fiber dispersion is flat over frequencies and does not vary along the fiber longitudinal direction.

In the SC compression, a large compression ratio can be obtained, however there are problems of degradation of pulse quality and the like because of a pedestal component included in the width of a compressed optical pulse.

On the other hand, an optical soliton generated by optical soliton compression is an optical pulse which is formed by balancing of the dispersion effect and the nonlinear effect of an optical fiber and has a waveform not changed during propagation.

For optical soliton, when the dispersion effect is gently decreased in the optical fiber longitudinal direction for example by reducing a dispersion value for a sufficiently long span for the distance called soliton period, a pulse waveform is self-shaped so as to compensate the reduced dispersion effect, which results in an optical pulse of small width. Alternatively, when the pulse amplitude is gently increased in the optical fiber longitudinal direction by performing distribution amplification by Raman amplification while maintaining the optical fiber dispersion constant, the nonlinear effect is enhanced, and then, a pulse waveform is self-shaped so as to compensate this enhanced nonlinear effect, which result in an optical pulse of small width. The method using such a phenomenon (balancing of the dispersion effect and the nonlinear effect) is called adiabatic soliton compression and capable of outputting optical pulses as optical solitons of sech function.

Adiabatic soliton compression makes it possible to generate sech function shaped waveform, that is, optical pulse waveform of high quality having no pedestal, and therefore, it is suitable for communication purposes.

In addition, when an optical pulse with pedestal is compared with an optical pulse having no pedestal, if both of them has the same energy and FWHM (full width at half maximum), the optical pulse with no pedestal has larger peak power. Therefore, the optical pulse with no pedestal is suitable for material processing purposes.

Meanwhile, it is known the adiabatic soliton compression is, as described above, performed in a method of gently varying optical fiber dispersion along the fiber longitudinal direction. In this method, as it is not easy to manufacture an optical fiber having dispersion which decreases continuously in the fiber longitudinal direction, some other methods are contemplated.

For example, optical fiber dispersion is divided into several sections along the fiber longitudinal direction and fibers having fixed dispersions corresponding to the respective sections are concatenated to approach the decreasing dispersion. An optical fiber configured by this method is called "Step-like Dispersion Profiled Fiber (SDPF)". According to this method, approximation accuracy is increased as the fiber has more steps (sections), however it is required to prepare many fibers of different dispersions.

As another method, it is contemplated to divide optical fiber dispersion into several sections along the fiber longitudinal direction and use two fibers of different dispersions in each of the sections to approximate the dispersion. An optical fiber configured by this method is called "Comb-like Dispersion Profiled Fiber (CDPF)" as the dispersion varies like comb in the fiber longitudinal direction (see Non-patent documents 1 and 2, Patent documents 1 and 2).

Non-patent document 1: S. V. Chernikov et al., "Integrated all optical fiber source of multigigahertz soliton pulse train", Electronics Letters, 1993, vol. 29, p. 1788

Non-patent document 2: S. V. Chernikov et al., "Comblike dispersion-profiled fiber for soliton pulse train generation", Optical Letters, 1994, vol. 19, no. 8, p. 539-541

Patent document 1: Japanese Patent Application Publication No. 2000-347228

Patent document 2: Japanese Patent Application Publication No. 2002-229080

DISCLOSURE OF THE INVENTION

Problems to be Solved by the Invention

However, the above-described conventional arts have the following problems.

In design of an optical pulse shaper based on the conventional ultra-short optical pulse generation techniques, it is difficult to determine the length of an optical fiber to perform soliton compression. For this reason, in the existing circumstances, determination of an optical fiber length is performed by trial and error.

In addition, conventionally, the optical fiber dispersion for generating nonlinear effect on optical pulses is preferably zero or near zero. However, the magnitude of this non-zero dispersion causes deterioration (distortion) in optical pulse width. For this reason, it is difficult to output optical pulses of high quality.

Further, in the conventional adiabatic soliton compression, although deterioration (distortion) does not occur in the optical pulse width, it is difficult to obtain large compression ratio.

It is an object of the present invention to provide an optical pulse shaper which is easy to design and capable of outputting optical pulses of desired width without causing noise due to deterioration in output optical pulse waveform, and also provide a designing method thereof.

Means for Solving the Problems

In order to solve the above-mentioned problems, a method of designing an optical pulse shaper according to a first aspect of the present invention is a method of designing an optical pulse shaper including a first optical propagation line unit having a nonlinear medium and a dispersion medium concatenated, the method including: specifying design specifications of the first optical propagation line unit; and based on the design specification, calculating a quasi-periodic stationary pulse of which a waveform of an input optical pulse to the first optical propagation line unit is similar to a waveform of an output pulse from the first optical propagation line unit.

A method of designing an optical pulse shaper according to a second aspect of the present invention is the method of designing an optical pulse shaper in which a second or a second and later optical propagation line units are subsequently concatenated to the first optical propagation line unit.

A method of designing an optical pulse shaper according to a third aspect of the present invention is the method of designing an optical pulse shaper, further including: specifying design specifications of the second or the second and later optical propagation line units.

A method of designing an optical pulse shaper according to a fourth aspect of the present invention is the method of designing an optical pulse shaper, in which the design specifications include at least a nonlinear coefficient, a dispersion value and a length in a light propagation direction of each of the nonlinear medium and the dispersion medium of each of the optical propagation line units and a power peak of the input optical pulse.

A method of designing an optical pulse shaper according to a fifth aspect of the present invention is the method of designing an optical pulse shaper, in which provided that generalized dispersion values of the nonlinear medium and the dispersion medium included in the first optical propagation line unit are $s_1$ and $s_2$, respectively, and normalized lengths of the nonlinear medium and the dispersion medium are $K_1$ and $L_1$, respectively, $s_2$ is a value of anomalous dispersion and satisfies a following equation and the values of $K_1$ and $L_1$ satisfy a following equation.

$$0 \leq |s_1| \ll 1 \ll s_2$$

$$L_1 \ll K_1$$

in which $|s_1|$ is an absolute value of $s_1$.

A method of designing an optical pulse shaper according to a sixth aspect of the present invention is the method of designing an optical pulse shaper, in which provided that generalized dispersion values of the nonlinear medium and the dispersion medium included in the nth optical propagation line unit (n is a positive integer equal to or more than 2) counting from the optical propagation line unit among the optical propagation line units are $s_{1n}$ and $s_{2n}$, respectively, and normalized lengths of the nonlinear medium and the dispersion medium are $K_n$ and $L_n$, respectively, $s_{2n}$ is a value of anomalous dispersion and satisfies a following equation and the values of $K_n$ and $L_n$ satisfy following equations.

$$s_{1n} = s_1/\alpha^{n-1}$$

$$s_{2n} = s_2/\alpha^{n-1}$$

$$K_n = K_1/\alpha^{n-1}$$

$$L_n = L_1/\alpha^{n-1}$$

α: a compression ratio

A method of designing an optical pulse shaper according to a seventh aspect of the present invention is the method of designing an optical pulse shaper, in which provided that generalized dispersion values of the nonlinear medium and the dispersion medium included in the nth optical propagation line unit (n is a positive integer equal to or more than 2) counting from the optical propagation line unit among the optical propagation line units are $s_{1n}$ and $s_{2n}$, respectively, and normalized lengths of the nonlinear medium and the dispersion medium are $K_n$ and $L_n$, respectively, $s_{2n}$ is a value of anomalous dispersion and satisfies a following equation and the values of $K_n$ and $L_n$ satisfy following equations.

$$s_{1n} = s_1/\alpha^{n-1}$$

$$s_{2n} = s_2$$

$$K_n = K_1/\alpha^{n-1}$$

$$L_n = L_1/\alpha^{2(n-1)}$$

α: a compression ratio

A method of designing an optical pulse shaper according to a eighth aspect of the present invention is the method of designing an optical pulse shaper, in which the input optical pulse is an optical pulse having a waveform close to a waveform of the quasi-periodic stationary pulse.

A method of designing an optical pulse shaper according to a ninth aspect of the present invention is the method of designing an optical pulse shaper, in which provided that the nonlinear coefficient and a loss coefficient of the nonlinear medium are $v$ and $\delta$, respectively, the nonlinear medium is a highly nonlinear medium with the values of $v$ and $\delta$ satisfying a following equation.

$$z = -(1/2\delta)ln(1-2\delta/a_0^2 v)\zeta)$$

z: a total length in the light propagation direction of the nonlinear medium in the optical pulse shaper, expressed by a real distance $\zeta$: a total length in the light propagation direction of the nonlinear medium in the optical pulse shaper, expressed by a normalized distance of dimensionless amount $a_0$: a power attenuation coefficient of an input end of an optical pulse of the nonlinear medium ln: logarithm natural A method of designing an optical pulse shaper according to a tenth aspect of the present invention is the method of designing an optical pulse shaper, in which the nonlinear medium is a highly nonlinear optical fiber and the dispersion medium is a single mode optical fiber.

An optical pulse shaper according to a first aspect of the present invention is an optical pulse shaper designed based on the method of any one of the above-described aspects.

Effect of the Invention

With the present invention, an optical pulse output from an optical pulse shaper including an optical propagation line unit (a plurality of optical propagation line units concatenated) of concatenation of a nonlinear medium and a dispersion medium has a waveform with approximately the same peak to pedestal ratio as the waveform of an optical pulse supplied to the optical pulse shaper. Accordingly, it is possible to sufficiently suppress deterioration (distortion) occurring in the optical pulse waveform output from the optical pulse shaper thereby to output an optical pulse train of extremely high quality.

Further, if a dispersion value and a length of the first optical propagation line unit through which an input pulse first propagates and a peak power of the input optical pulse are determined, it is possible to uniquely determine dispersion values and lengths of the second and later optical propagation line units provided as subsequent steps. Therefore, designing of the optical fiber shaper is significantly facilitated.

Furthermore, if the dispersion value of a nonlinear medium of the first optical propagation line unit is zero or near zero, dispersion values of respective nonlinear media of the second and later optical propagation line units provided as subsequent steps become approximately the same as the dispersion value of the nonlinear medium of the first optical propagation line unit, and therefore, designing of the optical fiber shaper is further facilitated.

BRIEF DESCRIPTION OF THE DRAWINGS

FIG. 23(a) shows a numerical simulation result and FIG. 23(b) shows an experimental result;

BEST MODE FOR CARRYING OUT THE INVENTION

Description below will be made about an embodiment to which the present invention is applied.

First description is about a configuration of an optical pulse outputting device 100 having an optical pulse shaper 30 to which the present invention is applied, and then, about the design theory of the optical pulse shaper 30. Last description is about specific examples of a detailed design of the optical pulse shaper 30 based o this design theory.

<Configuration of Optical Pulse Outputting Device 100.

Figure 1:
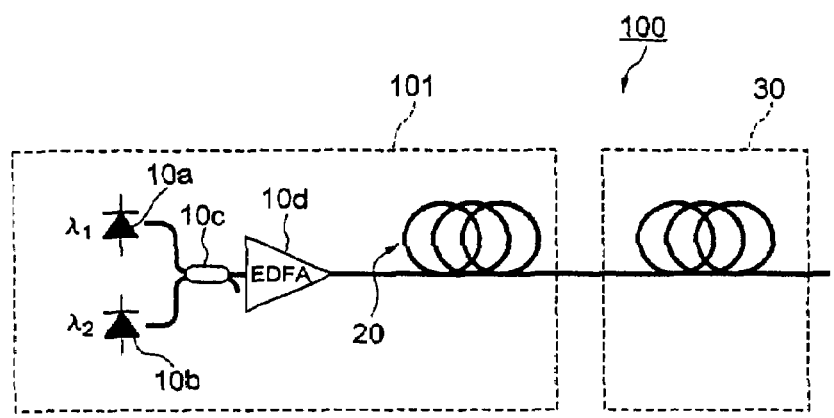
FIG. 1 is a view illustrating a configuration of an optical pulse outputting device according to an embodiment of the present invention.

First, FIG. 1 is referred to explain the configuration of an optical pulse outputting device 100 based on the design theory, which will be described in detail later.

As shown in FIG. 1, the optical pulse outputting device 100 has an optical pulse supplying device 101 and the optical pulse shaper 30 for compressing the pulse width of optical pulses output from the optical pulse supplying device 101.

The optical pulse supplying device 101 has a dual-frequency optical source 10 and an optical pulse shaper 20.

The dual-frequency optical source 10 includes two LDs (Laser Diodes) 10a and 10b for emitting CW(Continuous Wave) light beams of different frequencies, a combiner 10c for combining the CW light beams of different frequencies to output beat light (hereinafter referred also to "optical pulse") and EDFA (Erbium Doped Fiber Amplifier) 10d for amplifying the beat light.

The optical pulse shaper 20 is configured of an optical fiber and serves to shape optical pulses output from the dual-frequency optical source 10 into pulses of waveform appropriate to the subsequently-coupled optical pulse shaper 30.

The optical pulse shaper 30 is an optical propagation line having plural optical fibers of different types concatenated in the fiber longitudinal direction. After light from the optical pulse shaper 20 is input to the optical pulse shaper 30, it is compressed while propagating through this optical propagation line of the optical pulse shaper 30.

Figure 2:
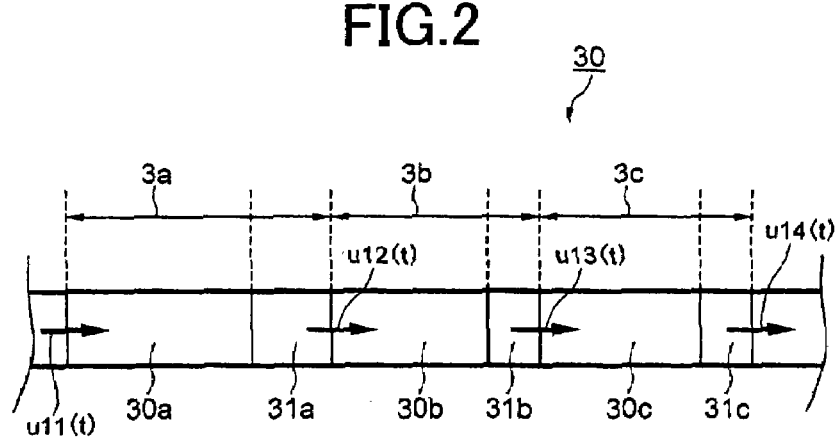
FIG. 2 is a view illustrating a configuration of an optical pulse shaper illustrated in FIG. 1.

Next description is made about a configuration of the optical pulse shaper 30 with reference to FIG. 2.

As shown in FIG. 2, the optical pulse shaper 30 is an optical fiber having optical fibers of parameters different to each other (dispersion value, nonlinear coefficient, length in fiber longitudinal direction and the like), or more specifically, nonlinear optical fibers 30a, 30b and 30c as nonlinear media and dispersion optical fibers 31a, 31b and 31c as dispersion media, which are concatenated alternately along the fiber longitudinal direction. In the description below, a composition of one nonlinear medium and one dispersion medium is defined as "one step". The optical pulse shaper 30 illustrated in FIG. 2 includes three steps.

In the nonlinear optical fiber 30a, a generalized dispersion value, which is a value obtained by normalizing a dispersion value by a nonlinear coefficient, is $s_1$, and a normalized length obtained by multiplying a length in the fiber longitudinal direction by the nonlinear coefficient is $\zeta_1$. In the dispersion optical fiber 31a, a generalized dispersion value is $s_2$, and a normalized length in the fiber longitudinal direction is $\zeta_2$-$\zeta_1$. In the nonlinear optical fiber 30b, a generalized dispersion value is $s_{12}$, and a normalized length in the fiber longitudinal direction is $\zeta_3$-$\zeta_2$. In the dispersion optical fiber 31b, a generalized dispersion value is $s_{22}$, and a normalized length in the fiber longitudinal direction is $\zeta_4$-$\zeta_3$. In the nonlinear optical fiber 30c, a generalized dispersion value is $s_{13}$, and a normalized length in the fiber longitudinal direction is $\zeta_5$-$\zeta_4$. In the dispersion optical fiber 31c, a generalized dispersion value is $s_{23}$, and a normalized length in the fiber longitudinal direction is $\zeta_6$-$\zeta_5$.

Further, the nonlinear optical fibers 30a, 30b and 30c receive an optical pulse u11(t), an optical pulse u12(t) and an optical pulse u13(t), respectively, and the dispersion optical fiber 31c outputs an optical pulse u14(t) ("t" is time)

<Design Theory of Optical Pulse Shaper 30>

Next description is made about the design theory of an optical pulse shaper 30 with the above-described configuration.

First, a quasi-periodic stationary pulse (the profile of the optical pulse u12(t) is similar to that of the optical pulse u11(t)) propagating through the nonlinear optical fiber 30a and the dispersion optical fiber 31a, which constitute the first step in the optical pulse shaper 30, is calculated.

Generally, the behavior of an optical pulse propagating in the optical fiber is expressed by the nonlinear Schrödinger equation.

$$i\frac{\partial Q}{\partial Z} - \frac{k''(Z)}{2}\frac{\partial^2 Q}{\partial T^2} + \gamma(Z)|Q|^2 Q = -i\frac{L(Z)}{2}Q \quad \text{[Equation 1]}$$

In the equation, Q(Z,T) [$W^{1/2}$] is an envelope amplitude of the electric field, Z [m] is a distance of an optical fiber in the fiber longitudinal direction, and T [s] is a delay time from the coordinate axis of carrier wave propagating at group velocity.

Also in the equation, k'''' (Z) [$s^2$/m], γ(Z) [$W^{-1}m^{-1}$], and L(Z) [$m^{-1}$] are a dispersion value, a nonlinear coefficient and a loss coefficient of the fiber, respectively, and these values vary along the fiber longitudinal direction.

Then, when the constants $Z_0$ [m], $T_0$ [s] and $P_0$ [W] are introduced to define dimensionless amounts of amplitude, distance and time in the equation 2 and variable transformation is performed in the equation 1, the following equation 3 is obtained.

$$q = \frac{Q}{\sqrt{P_0}}, z = \frac{Z}{Z_0}, t = \frac{T}{T_0} \quad \text{[Equation 2]}$$

$$i\frac{\partial q}{\partial z} + \frac{d(z)}{2}\frac{\partial^2 q}{\partial t^2} + v(z)|q|^2 q = -i\delta(z)q \quad \text{[Equation 3]}$$

Here, the values in the following equation 4 are normalized dispersion value, nonlinear coefficient and loss coefficient, which are dimensionless values.

$$d = -k'' \frac{Z_0}{T_0^2}, \quad v = \gamma P_0 Z_0, \quad \delta = \frac{L}{2} Z_0 \qquad \text{[Equation 4]}$$

In addition, the relationships between the above-mentioned normalized values and a dispersion value D [ps/nm/km], a nonlinear coefficient $\gamma(Z)$ [$W^{-1}km^{-1}$], and a loss coefficient L [dB/km] based on the unit system generally used in expressing parameters of an optical fiber are expressed by the following equations 5 to 7.

$$d = \frac{5(\lambda_0[\mu m])^2}{\pi c[\times 10^8 \text{ m/s}]} \frac{Z_0[\text{km}]}{(T_0[\text{ps}])^2} D[\text{ps/nm/km}] \qquad \text{[Equation 5]}$$

$$v = \gamma[W^{-1} \text{ km}^{-1}] P_0[W] Z_0[\text{km}] \qquad \text{[Equation 6]}$$

$$\delta = \frac{\ln 10}{20} L[\text{dB/km}] Z_0[\text{km}] \qquad \text{[Equation 7]}$$

In these equations, $\lambda_0$ [μm] is a wavelength in vacuum of a carrier wave, and c [$\times 10^8$ m/s] is a light velocity. In the description below, the values c and $\lambda_0$ are set as c=2.998 [$\times 10^8$ m/s] and $\lambda_0$=1.555 [μm], however, these conditions are not for losing generality.

As an example, when $Z_0$=1 [km], $T_0$=1 [ps], $P_0$=1 [W] are defined, relationships of a normalized dispersion value d=1.284 D, a normalized nonlinear coefficient $v=\gamma$ and a normalized loss coefficient $\delta$=0.1151 L can be obtained. In the case of SMF (Single Mode Fiber), when D=16 [ps/nm/km] is given, the normalized dispersion value is converted into d=20.54, when $\gamma$=1.3 [$W^{-1}km^{-1}$] is given, the normalized nonlinear coefficient is converted into v=1.3, and when L=0.2 [dB/km] is given, the normalized loss coefficient is converted into $\delta$=0.023.

In the above-mentioned normalized equation 3, the normalized dispersion value d(z), the normalized nonlinear coefficient v(z) and the normalized loss coefficient $\delta$(z) all vary along the fiber longitudinal direction, however, further variable transformation allows simplification of the respective normalized coefficients.

First, when the function a(z) defined in the following equation 8 is used in the equation 9, the equation 3 is transformed into the following equation 10. Here, the relationship of $a_0$=a(0)>0 is given.

$$a(z) = a(0)\exp\left[-\int_0^z \delta(z')dz'\right] \qquad \text{[Equation 8]}$$

$$q(z,t) = a(z)u(z,t) \qquad \text{[Equation 9]}$$

$$i\frac{\partial u}{\partial z} + \frac{d(z)}{2}\frac{\partial^2 u}{\partial t^2} + a^2(z)v(z)|u|^2 u = 0 \qquad \text{[Equation 10]}$$

Then, a new distance scale is defined by the following equation 11.

$$\zeta = f(z) = \int_0^z a^2(z')v(z')dz' \qquad \text{[Equation 11]}$$

In the equation, as $a^2(z)$ v(z) is always a positive value, $\zeta$ and z have one-to-one correspondence, z is expressed as z=$f^{-1}(\zeta)$. The value $\zeta$ is a value obtained by placing on a physical length a weight of an accumulated amount of the nonlinear effect, and is treated as a generalized length below.

When this value $\zeta$ is used to perform variable transformation of z on the equation (10), the following equation 12 can be obtained.

$$i\frac{\partial u}{\partial \zeta} + \frac{s(\zeta)}{2}\frac{\partial^2 u}{\partial t^2} + |u|^2 u = 0 \qquad \text{[Equation 12]}$$

Here, the following relationship is given.

$$s(\zeta) = \frac{d(z)}{a^2(z)v(z)} = \frac{d(f^{-1}(\zeta))}{a^2(f^{-1}(\zeta))v(f^{-1}(\zeta))} \qquad \text{[Equation 13]}$$

The values s($\zeta$) defined in the equation 13 is obtained by dividing a normalized dispersion value d by a power attenuation coefficient a(z) (see the definition of the equation 8) and a normalized nonlinear coefficient v(z) thereby to re-normalize and generalize the dispersion value. This s($\zeta$) is hereinafter called "generalized dispersion value". In addition, except where specifically noted in the normalized space expressed by the equation 12, a generalized length $\zeta$ and a generalized dispersion value s are simply referred to as "length" and "dispersion value".

Eventually, in the equation transformed like the equation 12, only the dispersion value varies along the fiber longitudinal direction. In other words, even when a dispersion value D [ps/nm/km], a nonlinear coefficient $\gamma$ [$W^{-1}km^{-1}$], and a loss coefficient L [dB/km] have any profile in the fiber longitudinal direction, the equations 9, 11 and 13 are transformed into a system (normalized space) in which the power loss is zero, the nonlinear coefficient is kept constant along the fiber longitudinal direction and only the dispersion value varies in the fiber longitudinal direction. In contrast, the discussion made in the normalized space can be applied to any real space if inverse transformation is performed with any constant numbers $Z_0$ [m], $T_0$ [s], $P_0$ [W]

Figure 3:
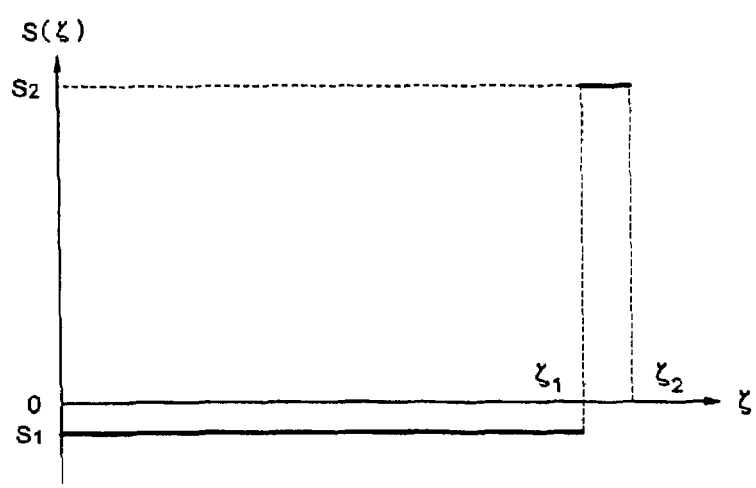
FIG. 3 is a view illustrating an example of dispersion map according to the embodiment of the present invention.

Here, a dispersion value s($\zeta$) of the first optical propagation line unit 3a varying in the fiber longitudinal direction is shown in FIG. 3 (the same goes for second optical propagation line units 3b and 3c). This figure is hereinafter called "dispersion map".

$\zeta_1$ is a length in the fiber longitudinal direction of the nonlinear optical fiber 30a and $\zeta_2$ is a length in the fiber longitudinal direction of the first optical propagation line unit 3a. Here, in 0<|$s_1$|<<1<<$s_2$ and 1>>$\zeta_2$-$\zeta_1$>0, $\zeta_1$ is not an extremely large or small value. Specifically, a given small amount 0<$\epsilon$<1 is used to express the order of the above-mentioned values quantitatively as |$s_1$|~O($\epsilon$), $s_2$~O(1/$\epsilon$), $\zeta_1$~O(1) and $\zeta_2$-$\zeta_1$~O($\epsilon$). In addition, in the equation 12, the coefficient of the third term at the left side of the nonlinear effect is an arbitrary point 1.

The description below deals with an example where the nonlinear optical fiber 30a is a HNLF (Highly-Nonlinear Fiber) (in real space, a dispersion value $D_1$=0 [ps/nm/km], a nonlinear coefficient $\gamma_1$=24 [$W^{-1}km^{-1}$], and when constants for normalization are set as $Z_0$=1 [km], $T_0$=1 [ps] and $P_0$=1 [W], a normalized dispersion value $d_1$ and a normalized nonlinear coefficient $v_1$ are set as $d_1$=0 and $v_1$=24), and the dispersion optical fiber 31a is a SMF (likewise, a dispersion value $D_2$=16 [ps/nm/km], a nonlinear coefficient $\gamma_2$=1.3 [$W^{-1}km^{-1}$], and a normalized dispersion value $d_2$=20.544 and a normalized nonlinear coefficient $v_2$=1.3). For ease of explanation, energy loss of the nonlinear optical fiber 30a and the dispersion optical fiber 31a is not considered and a(z)=1 is adopted in the equation 8. In this example, the generalized dispersion value shown in FIG. 3 is defined as $s_1=d_1/v_1=0$, $s_2=d_2/v_2=15.8$. Further, regarding the distance, if real distances of $Z_1=50$ [m], $Z_2=62.5$ [m] ($Z_2-Z_1=12.5$ [m]) are considered, $z_1=0.05$ and $Z_2=0.0625$ are used to obtain $\zeta_1=1.2$, $\zeta_2=1.21625$ ($\zeta_2-\zeta_1=0.01625$) and thereby the above conditions of $\zeta_1$, and $\zeta_2$ are satisfied.

When an optical pulse having an amplitude and a waveform of O(1) order propagates through the first propagation line unit 3a expressed by the dispersion map, and particularly, through the section of $0<\zeta<\zeta_1$ of the nonlinear optical fiber 30a, the dispersion effect is small and the nonlinear effect (Kerr effect) causes up-chirp, resulting in broadening of the frequency band (spectrum). Then, the order of an accumulated value of the nonlinear effect becomes O(1).

Specifically, the nonlinear coefficient is set at a constant value of 1, which means that the magnitude of the nonlinear phase shift in the peak of the optical pulse (which is given by $\Delta\phi=\gamma Pz$, where nonlinear coefficient is $\gamma=1$, power is P~O(1), and distance $z=\zeta_1$~O(1)), for example, becomes of order O(1). In addition to the nonlinear phase shift amount, the amounts of up-chirp due to the nonlinear effect and spectrum broadening also become of order O(1).

Meanwhile, when the optical pulse having an amplitude and a waveform of O(1) order propagates through the section $\zeta_1<\zeta<\zeta_2$ of the dispersion optical fiber 31a, the nonlinear effect becomes small because of the short distance. Besides, as the dispersion value in this section is set at a large positive value (namely, anomalous dispersion), the optical pulse propagation through this section behaves approximately linearly, the above-mentioned up-chirp due to the nonlinear effect in the section $0<\zeta<\zeta_1$ of the nonlinear optical fiber 30a is compensated and accordingly, the optical pulse width is compressed. Then, as the order of the dispersion value of the dispersion optical fiber is set at O(1/$\epsilon$) and the distance is at O($\epsilon$), the order of accumulated dispersion value becomes O(1).

Here, distances, instant values and accumulated values of the nonlinear effect and instant values and accumulated values of the dispersion effect of the nonlinear optical fiber 30a in the section of $0<\zeta<\zeta_1$ and of the dispersion optical fiber 31a in the section of $\zeta_1<\zeta<\zeta_2$ are shown in the table 1.

effect is O(1) however that of the nonlinear effect is O ($\epsilon$). See "Multiscale pulse dynamics in communication systems with strong dispersion management" M. J. Ablowitz et al., Optics Letters, Vol. 23, p 1668, 1998).

Besides, such an optical pulse that the waveform of an output optical pulse compressed while propagating through the first optical propagation line unit 3a is completely similar to that of the input pulse can be directly calculated by the equation (12) using the method called averaging (see "The averaging method for finding exactly periodic dispersion managed solitons", J. H. B. Nijhof et al., IEEE J. Sel. Top Quantum Electron, Vol. 6, pp. 330-336, 2000).

Here, the similarity of the waveform of the input optical pulse to that of the output optical pulse means that when given variable transformation is performed on the amplitude and the time of either waveform, the waveform matches the other waveform. In other words, when the waveform of an input optical pulse is $u_{in}(t)$ and the waveform of an output optical pulse output after propagating through the first optical propagation line unit 3a is $u_{out}(t)$, and the waveform $u_{in}(t)$ is subjected to variable transformation as shown in the following equation 14 using a given constant α (hereinafter referred to as "compression ratio"), the equation u' (t)=$U_{out}(t)$ can be obtained, $$u'(t)=\sqrt{\alpha}u_{in}(\alpha t) \quad \text{[Equation 14]}$$

The variable transformation of the equation 14 corresponds to multiplying of the amplitude of the input optical pulse by $\alpha^{1/2}$ and multiplying of the width by 1/α. With this transformation, the width is compressed to 1/α when α>1 with the pulse energy maintained.

Next description is made about the case when in the above-mentioned averaging, the initial waveform of an optical pulse (waveform of an input optical pulse) is $u_0(t)=P_0^{1/2}\text{sech}(t)$. Here, $P_0$ indicates a peak power of the optical pulse. The waveform $u_0'(t)$ of the output optical pulse output after propagating through the first optical propagation line unit 3a has a width compressed by interaction of spectrum broadening due to the nonlinear effect and anomalous dispersion, and the peak power is increased from the original value of $P_0$ to another $P_0'$.

Then, α in the equation $\alpha=P_0'/P_0$ is used to subject the compressed waveform $u_0'$ (t) of the output optical pulse to variable transformation of the equation 15.

TABLE 1

| Section | Distance | Nonlinear effect (Instantaneous value) | Nonlinear effect (Accumulated value) | Dispersion effect (Instantaneous value) | Dispersion effect (Accumulated value) |
|---|---|---|---|---|---|
| $0<\zeta<\zeta_1$ | O(1) | O(1) | O(1) | O(1) | O($\epsilon$) |
| $\zeta_1<\zeta<\zeta_2$ | O($\epsilon$) | O($\epsilon$) | O($\epsilon$) | O(1/$\epsilon$) | O(1) |

The order of the accumulated value of nonlinear effect of the nonlinear optical fiber 30a in the section of $0<\zeta<\zeta_1$ is O(1) and the order of the accumulated value of dispersion of the subsequently-provided dispersion optical fiber 31a in the section of $\zeta_1<\zeta<\zeta_2$ is O(1), and this point is a decisive difference between the first optical propagation line unit 3a expressed by dispersion map of FIG. 3 to which the present invention is applied and the optical propagation line through which propagate conventional optical solitons (the orders of accumulated values of dispersion and nonlinear effects are both O($\epsilon$). See "Guiding-center soliton in optical fibers", A. Hasegawa et al., Optics Letters, Vol. 15, p. 1443, 1990) and dispersion-managed soliton (the order of accumulated value of dispersion $$u_0''(t) = \frac{1}{\sqrt{\alpha}}u_0'\left(\frac{t}{\alpha}\right) \quad \text{[Equation 15]}$$

Next, the whole pulse phase is shifted in such a manner that the phase $\theta_0''$ of $u_0''(t)$ at the optical pulse center position t=0 matches the phase before propagation $\theta_0$. Then, the whole pulse amplitude is amplified or attenuated, and added by the input optical pulse waveform $u_0(t)$ to be divided into 2 and thereby one-time averaging calculation is completed.

Thus obtained $u_1(t)$ can be expressed by the following equation.

$$u_1(t) = \frac{1}{2}\left[u_0(t) + \sqrt{\frac{P_0}{P_0''}}\, u_0''(t) e^{i(\theta_0 - \theta_0'')}\right] \quad \text{[Equation 16]}$$

Then, $u_1(t)$ is used as waveform of the input optical pulse and the above-described averaging is performed again, thereby to obtain $u_2(t)$. Here, the second or later averaging calculation uses the compression ratio $\alpha$ decided in the first calculation.

By repeating of the above-described averaging calculation, the waveform of the output optical pulse after being compressed becomes similar to the waveform of the input optical pulse. Actually, the above-described averaging calculation is repeated about one hundred times thereby to obtain an input optical pulse having a waveform precisely similar to that of the output optical pulse.

Here, the above-described process of an obtaining quasi-periodic stationary pulse is summarized into the following (i) to (iv).

(i) The dispersion map illustrated in FIG. 3 (dispersion map the first optical propagation line unit 3a has) is decided.

(ii) The peak power $P_0$ of an optical pulse to be desired is decided. (iii) $P_0^{1/2}$ sech(t) is made to pass as input optical pulse through the first optical propagation line unit 3a, and the ratio of the peak power of the output optical pulse to the peak power of the input optical power is obtained to calculate a compression ratio $\alpha$. (iv) The decided compression ratio $\alpha$ is used to perform variable transformation of the equation 15, and the phase and the peak power are adjusted before the averaging calculation is repeated to converge on an optical pulse as periodic stationary solution.

The obtained optical pulse solution has a quasi-periodic stationary pulse having a preset peak power $P_0$ and a compression ratio $\alpha$ determined after the pulse first propagating through the first optical propagation line unit 3a. This quasi-periodic stationary pulse is a pulse found by the inventors of present invention and is different from a conventional one in the pulse propagation and has new behavior. The compression ratio $\alpha$ used is not necessarily a compression ratio determined after first propagating through the first optical propagation line unit 3a and may be determined to be any value before averaging.

In the above description, the averaging method is presented as a method of obtaining an exactly periodic stationary solution, however, there is another method of obtaining an approximate solution as follows: Parameters of the transmission line and the compression ratio are determined in advance, and for example, the pulse waveform is Gaussian function and optical pulses obtained by varying parameters such as amplitude, width and chirp are made to pass through a given transmission line for one period (step) and subjected to variable transformation of the equation 15. Then, a combination of parameters for the optical pulse closest to those of the input optical pulse is found as an optimal combination, and a pulse obtained by the optimal combination of parameters is regarded as a periodic stationary pulse.

Next, the above-mentioned quasi-periodic stationary pulse is described.

In the dispersion map shown in FIG. 3, $s_1=0$, $s_2=15.8$, $\zeta_1=1.2$, $\zeta_2=1.21625$ ($\zeta_2-\zeta_1=0.01625$) are set. When the input pulse $u_0(t)=P_0^{1/2}\text{sech}(t)$ has a peak power of $P_0=2$, the peak power of the output pulse after propagating through the first optical propagation line unit 3a in accordance with the dispersion map is 3.94356, which is 1.97178 times larger than the initial one.

Figure 4:
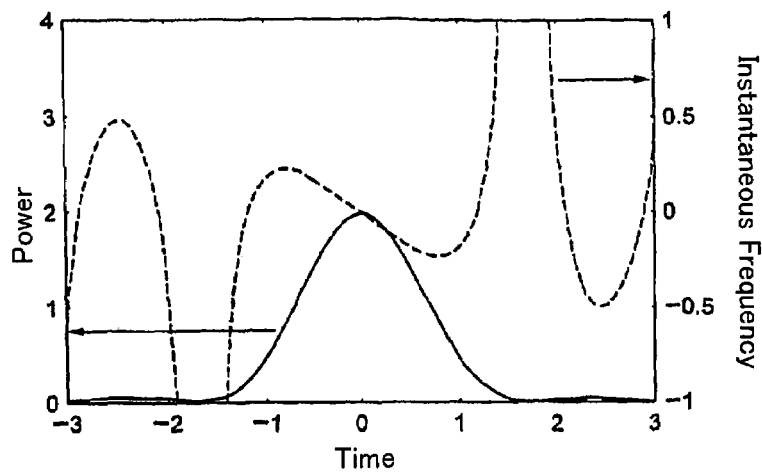
FIG. 4 is a graph of a power value of an input optical pulse and an instantaneous frequency of the input optical pulse.

Here, $\alpha=1.97178$ is set. This compression ratio $\alpha$ is used and the above-mentioned averaging calculation is performed one hundred times to obtain an optical pulse, of which the absolute values (solid line) and instantaneous frequency (dotted line) are shown in FIG. 4. Here, the instantaneous frequency is defined as a value obtained by multiplying the time differentiation of the phase by "−1".

Figure 5:
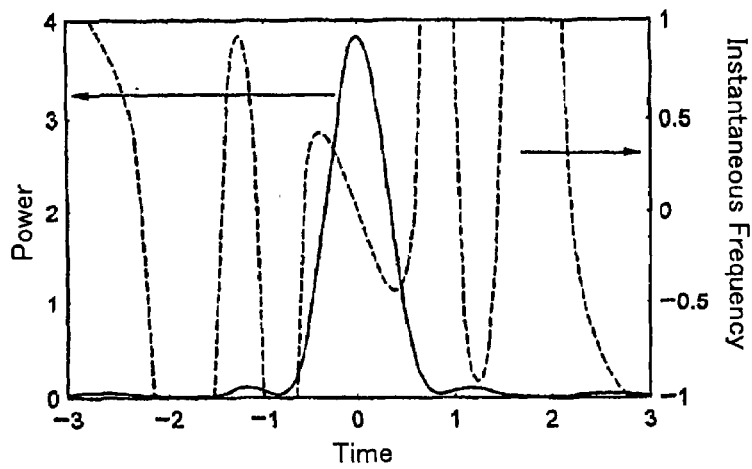
FIG. 5 is a graph of a power value of an output optical pulse and an instantaneous frequency of the output optical pulse.

FIG. 5 illustrates a waveform of an optical pulse which has further propagated through the first optical propagation line unit 3a and has a width compressed by $1/\alpha=0.507$ times.

Figure 6:
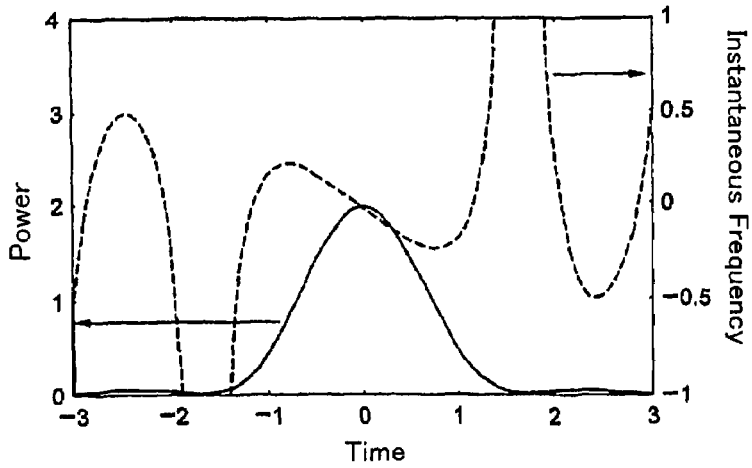
FIG. 6 is a graph of a power value of an optical pulse obtained after performing variable transformation on the output optical pulse shown in FIG. 5 and an instantaneous frequency of the optical pulse.

FIG. 6 illustrates a waveform obtained by subjecting the waveform of FIG. 5 to the variable transformation of the equation 15. As this waveform matches that shown in FIG. 4 precisely, it is confirmed that the waveforms before and after compression (the waveform of an input optical pulse to the first optical propagation line unit 3a and the waveform of an output optical pulse from the first optical propagation line unit 3a) are completely similar.

Since the waveform illustrated in FIG. 4 is returned to the initial waveform (the waveform of the input optical pulse) after propagating the first optical propagation line unit 3a and being subjected to variable transformation, its pulse is a quasi-periodic stationary pulse.

The waveform illustrated in FIG. 4 is characterized by having an instantaneous frequency (nonlinear chirp) varying linearly relative to the time and particularly down-chirp at the center of the pulse, and having small pedestal.

Figure 7:
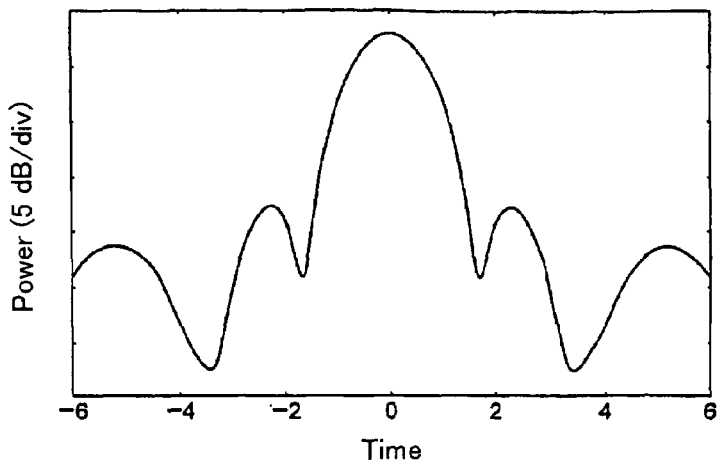
FIG. 7 is a graph of a waveform logarithmically showing the power value shown in FIG. 4.

In addition, the waveform illustrated in FIG. 7 is a logarithmical expression of the waveform of FIG. 4 and the waveform at the center is approximately parabolic. This result shows that the center of the optical pulse can be approximated precisely by the Gaussian function.

Next, the properties of the thus calculated quasi-periodic stationary pulse are described. In the following description, differences between the quasi-periodic stationary pulse and a known optical soliton (that is, averaged soliton, dispersion-managed soliton) are further described.

For an averaged soliton, guiding-center soliton (see "Guiding-center soliton in optical fibers" A. Hasegawa et al., Optics Letters, Vol. 15, p. 1443, 1990), as perturbation of O(1) order (that is, nonlinearity effect or dispersion effect varying in the fiber longitudinal direction) is added in a short period (which is sufficiently short amplifier interval as compared with the soliton dispersion distance, or the dispersion management period, and hereinafter referred to as O($\epsilon$) using $\epsilon$ of $0<\epsilon<<1$), the accumulated values of both of the nonlinearity effect and the dispersion effect over one step (for example, optical propagation line of concatenated nonlinear optical fibers and dispersion optical fibers, like the first optical propagation line unit 3a) becomes in the order of O($\epsilon$).

Further, for the dispersion-managed soliton (see N. J. Smith et al., Electronics Letters, vol. 32, P. 54, 1996), as large local dispersion value (in the order of O(1/$\epsilon$)) is added in a short period of the order O($\epsilon$) (which is sufficiently short distance as compared with the dispersion distance corresponding to an average dispersion value or nonlinear distance), the accumulated value of the dispersion effect due to perturbation over one period (step) (for example, optical propagation line of concatenated normal dispersion fibers and anomalous dispersion fibers) is in the order of O(1) and the accumulated value of the nonlinearity effect is in the order of O($\epsilon$). When attention is given particularly to chirp, for example, after linear up-chirp caused by large normal dispersion is accumulated in the order of O(1), linear down-chirp is accumulated due to large anomalous dispersion. Here, the average dispersion value is set at a small value, the two linear chirps are almost canceled. From this property, the dispersion-managed soliton is regarded as a linear pulse which the dispersion effect is dominant locally and is a stationary pulse formed by distributional cancellation of small nonlinear effect and dispersion effect. Here, the order of the normal dispersion and anomalous dispersion can be inverted.

On the other hand, a quasi-periodic stationary pulse propagating the first optical propagation line unit $3a$ in this embodiment experiences the nonlinear effect over the distance of $O(1)$ order (the length of the nonlinear optical fiber $30a$) by the intensity of $O(1)$ order. Further, it experiences the dispersion effect over the distance of $O(\epsilon)$ order (the length of the dispersion optical fiber $31a$) by the intensity of $O(1/\epsilon)$ order. With this configuration, each of the effects is accumulated in one period (step) (the first optical propagation line unit $3a$) which amounts are both of $O(1)$ order. Accordingly, the quasi-periodic stationary pulse in this embodiment is absolutely different in the pulse propagation mechanism from the averaged soliton and the dispersion managed soliton.

Specifically, as the quasi-periodic stationary pulse in the present embodiment propagates through the first optical propagation line unit $3a$, up-chirp (nonlinear chirp) due to the nonlinear effect accompanied with spectrum broadening is caused and then, down-chirp (linear chirp) due to anomalous dispersion effect is caused to cancel the up-chirp so that chirp returns to the initial state. In this process, there occurs a significant characteristic of compressing of the width of the optical pulse.

Here, the characteristics of the averaged soliton, the dispersion-managed soliton and the quasi-periodic stationary pulse in this embodiment are compared and summarized in the table 2.

TABLE 2

| Pulses | Nonlinear effect Accumulated value | Dispersion effect Accumulated value | Function type of center portion | Pedestal |
|---|---|---|---|---|
| Avenaged soliton | $O(\epsilon)$ | $O(\epsilon)$ | sech type | Absent |
| Dispersion-managed soliton | $O(\epsilon)$ | $O(1)$ | Gauss type | Present |
| Quasi-periodic stationary pulse | $O(1)$ | $O(1)$ | Gauss type | Present |

In the dispersion-managed propagation system, as the accumulated dispersion value is decreased, the dispersion-managed soliton approaches to the averaged soliton. In the case of the quasi-periodic stationary pulse in this embodiment, as one period is shortened and the accumulated values of the nonlinear effect and the dispersion effect are decreased, the compression ratio $\alpha$ approaches 1 and the quasi-periodic stationary pulse becomes close to the averaged soliton. Thus, when the compression ratio is small, this phenomenon corresponds to the adiabatic soliton compression (see Chernikov et al., Electronics Letters, vol. 29, p. 1788, 1993).

The waveforms illustrated in FIGS. 4 to 7 are those obtained at $s_1=0$ (zero dispersion) in FIG. 3, and when $s_1$ is a predetermined value of zero or around zero, the quasi-periodic stationary pulse in the present embodiment has the characteristic changed depending on the symbol.

Figure 8:
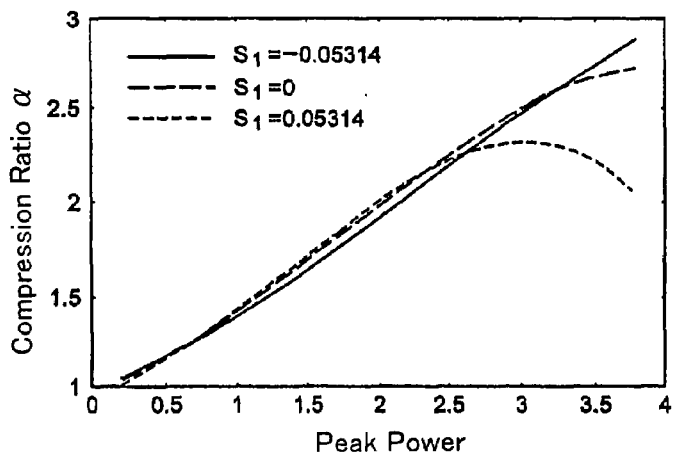
FIG. 8 is a graph of the relationship between a peak power value and a compression ratio.
Figure 9:
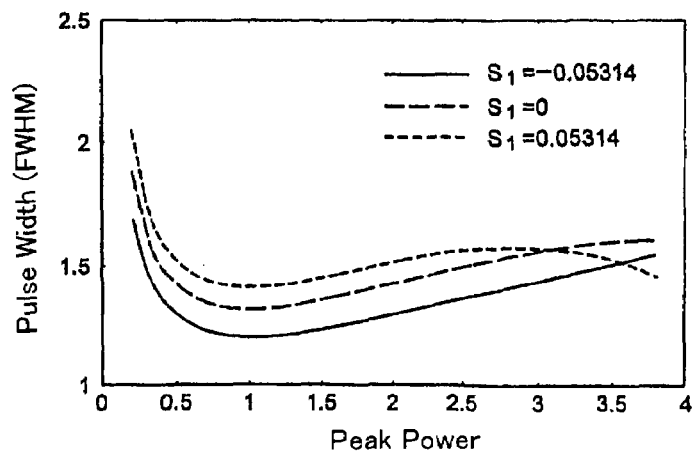
FIG. 9 is a graph of the relationship between a peak power value and a FWHM.

Next, in the three cases of $s_1=-0.05314$, 0, 0.05314, an input optical pulse is $P_0^{1/2}\mathrm{sech}(t)$ and the peak power $P_0$ varies, and then, averaging is performed to calculate each convergent solution. The compression ratio $\alpha$ for the peak power $P_0$ and a FWHM of convergent solution are shown in FIGS. 8 and 9. Here, solid line, broken line, and dotted line denote results of $s_1=-0.05314$, 0, 0.05314, respectively.

As shown in FIG. 8, in $P_0<2.5$, dependence on $s_1$ is not seen, however, when $P_0>2.5$, the compression ratio become decreased at $s_1=0.05314$ (anomalous dispersion). On the other hand, the width of a convergent optical pulse exhibits quantitatively certain degree of dependence on $s_1$, however, it is not qualitatively large dependence.

Figure 10:
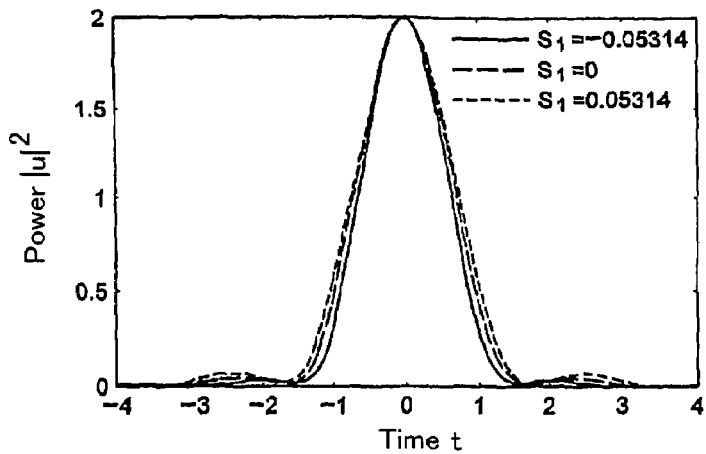
FIG. 10 is a graph of optical pulses having a peak power value of 2.

FIG. 10 shows the waveforms of the respective values of $s_1$ at $P_0=2$, in which the waveform of $s_1=-0.05314$, shown by the solid line, presents less pedestal. From the result in FIG. 8, the compression ratio is approximately $\alpha \sim 2$ and FWHM is not much varied, and in order to obtain the waveform of less pedestal, the dispersion value $s_1$ is preferably set at a negative value (normal dispersion).

In addition, if the width of the optical pulse as convergent solution is desired to vary, the dispersion value $s_2$ of the dispersion optical fiber $31a$ may be changed. Here, $P_0=2$ and $\alpha=2$ are fixed and $s_2$ is only changed to obtain the convergent solution, which optical pulse waveform is illustrated in FIG. 11.

Figure 11:
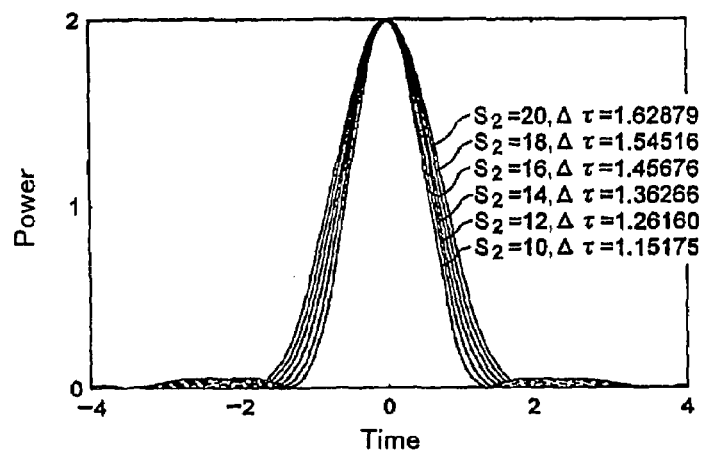
FIG. 11 is a graph of convergence solution obtained by varying an anomalous dispersion value while the compression ratio is fixed at 2.
Figure 12:
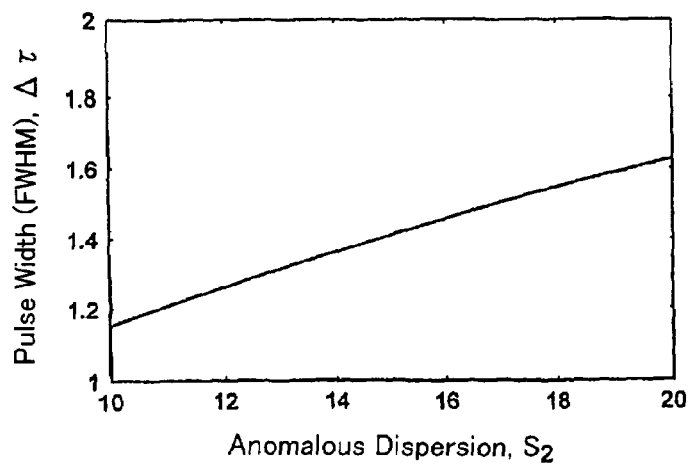
FIG. 12 is a graph of FWHM of convergence solution obtained by varying an anomalous dispersion value.

As illustrated in FIG. 11, as the dispersion value of the dispersion optical fiber $31a$ increases, the width is increased with the pedestal unchanged in scale. FIG. 12 shows FWHM of the convergent solution for $s_2$, in which $s_2$ and the FWHM are in proportion.

In the dispersion optical fiber $31a$, as the nonlinear effect is small and ignorable, and the accumulated dispersion value only affects pulse propagation, the length in the fiber longitudinal direction of the dispersion optical fiber $31a$, $\zeta_2-\zeta_1$, may vary instead of $s_2$ varying.

Eventually, after the peak power $P_0$ and the compression ratio $\alpha$ are set arbitrarily, the dispersion value or the length in the fiber longitudinal direction of the dispersion optical fiber $31a$ is changed to set the accumulated dispersion value appropriately, thereby making the width of a convergent pulse vary.

As described above, when variable transformation of the equation 15 is performed on the waveform of an output pulse after propagating through the first optical propagation line unit $3a$, the waveform of the output optical pulse matches that of the input optical pulse completely. Therefore, the optical pulse is able to propagate through the first optical propagation line unit $3a$ repeatedly as a stationary pulse (assuming that plural first optical propagation line units $3a$ are coupled).

On the other hand, instead of variable transformation of the equation 15, the dispersion map shown in FIG. 3 is varied per step (period) (namely, per optical propagation line unit) thereby to obtain the absolutely the same result.

Detailed description thereof is given below.

Here the dispersion map $s(\zeta)$ of FIG. 3 is used and the equation 11 is rewritten with $u(t)$ as input pulse.

$$i\frac{\partial u}{\partial \zeta} + \frac{s(\zeta)}{2}\frac{\partial^2 u}{\partial t^2} + |u|^2 u = 0 \qquad \text{[Equation 17]}$$

Here, when the waveform of an optical pulse of which the width is compressed after one-step propagation is $u'(t)$, relationship between $u(t)$ and $u'(t)$ can be expressed using the compression ratio $\alpha$ as follows:

$$u'(t)=\sqrt{\alpha}u(\alpha t) \qquad \text{[Equation 18]}$$

Meanwhile, propagation of $u'(t)$ with a new dispersion map $s'(\zeta)$ is expressed by the following equation.

$$i\frac{\partial u'}{\partial \zeta} + \frac{s'(\zeta)}{2}\frac{\partial^2 u'}{\partial t^2} + |u'|^2 u' = 0 \qquad \text{[Equation 19]}$$

When the equation 18 is substituted into the equation 19, the following equation 20 can be obtained.

$$i\frac{\partial}{\partial \zeta}\sqrt{\alpha}\,u(\alpha t) + \frac{s'(\zeta)}{2}\frac{\partial^2}{\partial t^2}\sqrt{\alpha}\,u(\alpha t) + \qquad \text{[Equation 20]}$$
$$\alpha\sqrt{\alpha}\,|u(\alpha t)|^2 u(\alpha t) = 0$$

Here, variable transformation of the equation 21 is performed.

$$\zeta'=\alpha\zeta, \tau=\alpha t \qquad \text{[Equation 21]}$$

Then, the equation 20 is transformed into the following.

$$i\frac{\partial u}{\partial \zeta'} + \frac{\alpha s'(\zeta'/\alpha)}{2}\frac{\partial^2 u}{\partial \tau^2} + |u|^2 u = 0 \qquad \text{[Equation 22]}$$

If it is assumed that $\alpha s'(\zeta'/\alpha)=s(\zeta')$, the equation 22 matches the equation 17 in the coordinate system of $\zeta'$ and $\tau$. In the other words, from the equation $s'(\zeta)=s(\alpha\zeta)/\alpha$, if the length in the fiber longitudinal direction o and dispersion value f the dispersion map are multiplied by $1/\alpha$ per step, the variable transformation of the equation 18 is performed per step and thereby an optical pulse propagates in the similar waveform every step.

Figure 13:
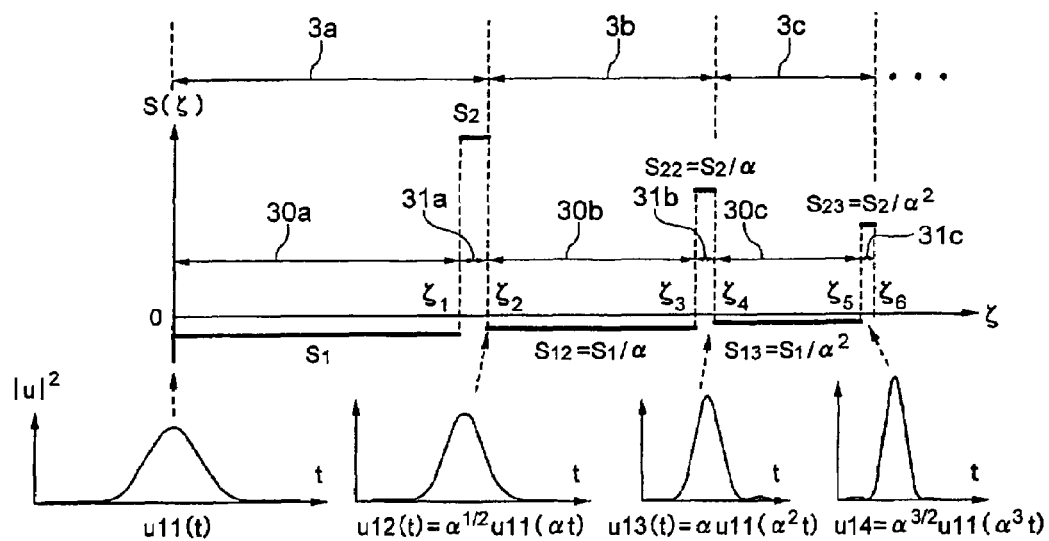
FIG. 13 is a schematic diagram of dispersion map and behaviors of quasi-periodic stationary pulses when the dispersion map is varied.

This situation is illustrated in a schematic diagram of FIG. 13. Here, if n>=2 and $\zeta_0=0$, $\zeta_{2n-1}-\zeta_{2n-2}=(\zeta_{2n-3}-\zeta_{2n-4})/\alpha=\zeta_1/\alpha^{n-1}$, and $\zeta_{2n}-\zeta_{2n-1}=(\zeta_{2n-2}-\zeta_{2n-3})/\alpha=(\zeta_2-\zeta_1)/\alpha^{n-1}$ are satisfied.

ON the other hand, in the dispersion map shown in FIG. 3, as $0<|s_1|<<1<<s_2$ and $\zeta_1>>\zeta_2-\zeta_1$ are considered, the dispersion effect is dominant in the area of $\zeta_1<\zeta<\zeta_2$ of the first optical propagation line unit 3a and the nonlinear effect is ignorable. Then, if, instead of multiplication by $1/\alpha$ of the length in the fiber longitudinal direction and the dispersion value per step, the length in the fiber longitudinal direction is only multiplied by $1/\alpha^2$ without the dispersion value changed, the equivalent result can be obtained. Thus obtained dispersion map and optical pulse propagation are illustrated in a schematic diagram of FIG. 14. Here, if n>=2 and $\zeta_0=0$, $\zeta_{2n-1}-\zeta_{2n-2}=(\zeta_{2n-3}-\zeta_{2n-4})/\alpha=\zeta_1/\alpha^{n-1}$, and $\zeta_{2n}-\zeta_{2n-1}=(\zeta_{2n-2}-\zeta_{2n-3})/\alpha^2=(\zeta_2-\zeta_1)/\alpha^{n-1}$ are satisfied.

Here, if $s_1$ is a sufficiently small value (zero or a value in the vicinity of zero), even if $s_1=s_{12}=s_{13}\ldots$, the same result can be obtained.

<Specific Example of Designing Optical Pulse Shaper 30>

With an optical pulse shaper 30 having a dispersion map of the dispersion value and the length in the fiber longitudinal direction multiplied by $1/\alpha$ per step as illustrated in FIG. 13, an input optical pulse obtained by numeral calculation and having a waveform close to quasi-periodic stationary pulse waveform with the compression ratio $\alpha$ is used. Then, compression like that in the quasi-periodic stationary pulse can be obtained actually. Design of such an optical pulse shaper 30 is specifically described below.

In the design based on the method of the present invention, there exists facultativity for various parameters. Accordingly, an actual process of several design guides is described briefly. What is first to perform is designing a provisional propagation line in the normalized space to obtain a quasi-periodic stationary pulse of an optical pulse propagating through the propagation line. The compression ratio $\alpha$ may be derived from this process or may be set at any value separately. The compression ratio $\alpha$ is the same value as that in the real space. If the compression ratio $\alpha$ is determined in the former manner, it is necessary to set the provisional propagation line and parameters of the quasi-periodic stationary pulse to obtain a desired compression ratio $\alpha$. Of the provisional propagation line, a generalized dispersion value is given by the embodiment in FIG. 3. What is important in determining the normalized length in the fiber longitudinal direction of the nonlinear optical fiber 30a and the peak power of the quasi-periodic stationary pulse is a nonlinear phase shift amount $\Delta\phi$ of an optical pulse in the nonlinear optical fiber 30a. Since the compression ratio $\alpha$ is approximately proportional to $\Delta\phi$ as shown in FIG. 8, the compression ratio $\alpha$ is determined by a product of the normalized length $\zeta_1$ in the fiber longitudinal direction of the nonlinear optical fiber 30a and the peak power. Therefore, these values are set to be any values depending on the design guides considered later. As the accumulated dispersion value of the dispersion optical fiber 31a and the width of the quasi-periodic stationary pulse are also in proportion as shown in FIG. 12, these values can be set at any values. Description below is made about examples of the design guides.

(1) In the case where the fiber parameters in the real space are determined and the lengths of the nonlinear optical fiber 30a and the dispersion optical fiber 31a in the first period are determined, as the propagation line in the real space is set, a propagation line in the normalized space can be obtained uniquely. If the peak power of quasi-periodic stationary pulse in the normalized space is changed, the compression ratio $\alpha$ and the pulse width can be obtained corresponding to values shown in FIGS. 8 and 9. After a desired compression ratio $\alpha$ or a desired width is selected to be transformed into the real space, the requirement of an input optical pulse and design of second and later steps are determined. If increase of the compression ratio $\alpha$ increases peak-to-pedestal ratio inconveniently, a small compression ratio $\alpha$ is selected consciously and the number of steps in the optical pulse shaper 30 is increased thereby to realize a desired compression ratio $\alpha$ in the end.

(2) In the case where the fiber parameters in the real space are determined and requirements of an input optical pulse are determined, as the lengths of the nonlinear optical fiber 30a and the dispersion optical fiber 31a are changed arbitrarily, these lengths may be also changed in the normalized space arbitrarily. Then, the lengths in the fiber longitudinal direction of the optical fibers in the normalized space are adjusted so as to obtain a quasi-periodic stationary pulse in the normalized space which satisfies the requirements after transformation into the real space. More specifically, the peak power and the pulse width in the normalized space are determined in advance, and then, it becomes possible to determine the normalized length $\zeta_1$ in the fiber longitudinal direction of the nonlinear optical fiber 30a which gives nonlinear phase shift corresponding to the desired compression ratio $\alpha$ and the normalized length $\zeta_2-\zeta_1$ in the fiber longitudinal direction of the dispersion optical fiber 31a which gives a predetermined accumulated dispersion value. With this configuration, real-space design can be determined.

As described in the above example, there is considered a process of deriving an optimal value satisfying desired conditions, that is appropriate setting in the normalized space for the give design guide, and reflecting this value in actual design. In the following description, the above-described example (1) is used as a basis to present a specific example. However, the propagation line is determined in advance as described in the paragraph [0063] and the desired compression ratio α used is a value as defined in the paragraph [0083]. That is, the conditions are set as described in the paragraphs [0121] and [0122].

First described is the case where power loss of the optical fiber is not considered.

In the following description, as an example, design is considered based on propagation of a quasi-periodic stationary pulse with $P_0=2$ and $s_1=0$. Here, the FWHM of the quasi-periodic stationary pulse is 1.43119 and the compression ratio is α1.97178 as calculated above.

In the dispersion map shown in FIG. 3 (that is, in the first optical propagation line unit $3a$), $s_1=d_1/v_1=0$, $s_2=d_2/v_2=15.8$, $\zeta_1=v_1z_1=1.2$, $\zeta_2=v_1z_1+v_2(z_2-z_1)=1.21625$ and $d_1=0$ are given. Then, when $v_1=24$, and $v_2=1.3$, $d_2=20.54$, $z_1=0.05$, and $z_2=0.0625$ are obtained.

Next, the parameters for variable transformation are set as $Z_0=\alpha^n$ [km], $T_0=\alpha^n$ [ps] and $P_0=\alpha^{-n}$ [W] (n is any integer), the normalized dispersion value d, the normalized nonlinear coefficient v, the length in the fiber longitudinal direction z, the time axis t, and the amplitude q are transformed into D [ps/nm/km]=0.784 $\alpha^n$d, γ [$W^{-1}km^{-1}$]=v, Z [km]=$\alpha^n$z, T [ps]=$a^n$t, Q [$w^{1/2}$]=$\alpha^{-n/2}$q in the real space.

Further, it is assumed that the nonlinear effect is ignorable in the dispersion optical fiber $31a$, the method of changing only the length in the fiber longitudinal direction without the dispersion value changed may be used (see dispersion map in FIG. 14), in which case, the dispersion value and the length in the fiber longitudinal direction may be set as D [ps/nm/km]= 0.784d, Z [km]=$\alpha^{2n}$z, respectively.

When n=0, $D_1=0$ [ps/nm/km], $\gamma_1=24$ [$W^{-1}km^{-1}$], $D_2=16$ [ps/nm/km], $\gamma_2=1.3$ [$W^{-1}km^{-1}$], $Z_1=0.05$ [km] and $Z_2=0.0625$ [km] are given. Besides, an optical pulse having a peak power of 2 and FWHM of 1.43119 in the normalized space has a peak power of 2 [W] and FWHM of 1.43119 [ps] in the real space. The dispersion value and the nonlinear coefficient in this case are suitable in using HNLF (dispersion value 0 ps/nm/km, nonlinear coefficient 24 $W^{-1}km^{-1}$) as the nonlinear optical fibers $30a$, $30b$ and $30c$ and using SMF (dispersion value 16 ps/nm/km, nonlinear coefficient 1.3 $W^{-1}km^{-1}$) in the dispersion optical fibers $31a$, $31b$ and $31c$.

Meanwhile, when n=1, $D_1=0$ [ps/nm/km], $\gamma_1=24$ [$W^{-1}km^{-1}$], $D_2=31.55$ [ps/nm/km], $\gamma_2=1.3$ [$W^{-1}km^{-1}$], $Z_1=0.098589$ [km] and $Z_2=0.01232362$ [km] are given. Besides, an optical pulse having a peak power of 2 and FWHM of 1.43119 in the normalized space has a peak power of 1.0143 [W] and FWHM of 2.822 [ps] in the real space. Here, assuming that the dispersion effect is dominant in the dispersion optical fibers $31a$, it is equivalent even if $D_2=16$ [ps/nm/km], $Z_2=0.147188$ [km].

In this way, by changing n value, it is possible to determine parameters of the input optical pulse of any scale and design of the first period of the dispersion map (that is, the first optical propagation line unit $3a$).

Next, when n=1, a specific design example and a simulation result showing optical pulse compression by numeral calculation carried out based on the design example are described.

A quasi-periodic stationary pulse is closely analogous to the Gaussian function around the pulse center, but has small pedestal and nonlinear chirp (see FIG. 4). However, in the following description, the input optical pulse is set as a chirp-free Gaussian pulse having a peak power of 1.043 [W] and a FWHM of 2.822 [ps].

The design of the first period propagation line (that is, the first optical propagation unit $3a$) is made as $D_1=0$ [ps/nm/km], $\gamma_1=24$ [$W^{-1}km^{-1}$], $D_2=16$ [ps/nm/km], $\gamma_2=1.3$ [$W^{-1}km^{-1}$], $Z_1=0.098589$ [km] and $Z_2=0.147188$ [km].

Design of the second and later transmission line (that is, the second optical propagation units $3b$. $3c$ and later) may be determined by using the compression ratio α and the method shown in the dispersion map of FIG. 14.

In this case, the compression ratio α is preferably α=1.97178. However, in order to confirm effectiveness, the propagation line design of the second and later steps with the compression ratio set as α'=1.8, 2.0, 2.2. In this case, the optical pulse compression is checked by direct numeral calculation of the equation 1. Here, the fiber loss and high-order dispersion and high-order nonlinearity are ignored.

Table 3 show HNLF length, SMF length and width and compression ratio (ratio of width of input and output optical pulses) for each of the above-mentioned values of the compression ratio α'. The input optical pulse and the 1$^{st}$ step propagation line are the same for all of the values α'.

TABLE 3

|  |  | α' = 1.8 | α' = 2.0 | α' = 2.2 |
|---|---|---|---|---|
| 1st step | HNLF length [m] | 98.589 | the same | the same |
|  | SMF length [m] | 48.599 | as in α' = 1.8 | as in α' = 1.8 |
|  | Output optical pulse width [ps] | 1.413 |  |  |
|  | Compression ratio | 1.997 |  |  |
| 2nd step | HNLF length [m] | 54.7717 | 49.2945 | 44.8132 |
|  | SMF length [m] | 14.9997 | 12.1497 | 10.04111 |
|  | Output optical pulse width [ps] | 0.778 | 0.720 | 0.698 |
|  | Compression ratio | 1.816 | 1.963 | 2.024 |
| 3rd step | HNLF length [m] | 30.4287 | 24.6473 | 20.3696 |
|  | SMF length [m] | 4.62953 | 3.03743 | 2.07461 |
|  | Output optical pulse width [ps] | 0.459 | 0.371 | 0.351 |
|  | Compression ratio | 1.695 | 1.941 | 1.989 |

When the compression ratio is close to the ideal value, α'=2.0, the width of the third-step output optical pulse (that is, optical pulse output from the third optical propagation line unit $3c$) is compressed into 0.371 ps, while at the compression ratio of α'=1.8, the width is only compressed to 0.459 ps. Besides, at the compression ratio of α'=2.2, the width of the third-step output optical pulse is compressed into 0.351 ps.

For each value of the above compression ratios α', the time and power of the waveforms of second step and third-step output optical pulses are normalized, and normalized results are plotted in FIGS. 15 to 20, with those of the numerically obtained quasi-periodic stationary pulse of FIG. 4 superposed. A solid line denotes pulse compression result when the compression ratio α' is used and a broken line denotes the quasi-periodic stationary pulse of FIG. 4.

In addition, as shown in FIGS. 15 to 20, when the compression ratio is α'=2.0, the optical pulse waveform is compressed while keeping the waveform closest to the quasi-periodic stationary pulse waveform. When the waveform is shifted from the quasi-periodic stationary pulse waveform, the compressed waveform of the optical pulse is unfavorably distorted each time when the optical pulse propagates each step of the propagation line. Besides, the power of the optical pulse is more decreased than that of the quasi-periodic stationary pulse. This is because of power loss due to deviation of the input optical pulse from the quasi-periodic stationary pulse. This power loss can be compensated by adding pre-emphasis to the optical pulse power in actually compressing the optical pulse (Here, the quasi-periodic stationary pulse has nonlinear chip and down-chirp around the center. When this is dispersion-compensated to approach chirp-free state, the peak power is increased to a certain degree. Adjusting of an input pulse to have the peak power is defined as addition of pre-emphasis).

Here, if a chirp-free Gaussian pulse is used as input optical pulse, the actual output optical pulse becomes close to a quasi-periodic stationary pulse. For this reason, the waveform has a certain margin, and for example, even if a sech-type pulse is used, the similar result can be obtained.

Further, as the center portion of the quasi-periodic stationary pulse has a down-chirp, the optical pulse which is input to the HNLF is required to have a down-chirp. SMF length has to be designed based on this, and the design result shown in the table 3 reflect this point.

In the table 3, the widths of second-step and third-step output optical pulses are less than 1 ps. In this case, it is necessary to take into account influence of the high-order effect including high-order dispersion, Raman self-frequency, exactly.

Next, consideration is made about the case where power loss of the optical fiber is considered.

When there occurs power decrease due to power loss occurring the optical fiber itself or power loss occurring a connecting portion between the optical fibers, the power loss can be easily compensated by lengthening, corresponding to the decrease, the length of the nonlinear optical fiber 30*a* in the fiber longitudinal direction, (corresponding to effective length, see "Nonlinear Fiber Optics", C. P. Agrawal, Academic Press, $3^{rd}$. ed., p. 98, 2001). For this reason, in the dispersion map shown in FIG. 13, the length in the fiber longitudinal direction of the nonlinear optical fiber is multiplied by $1/\alpha$ per each step, however, when the total power loss per step exceed a given threshold, the fiber length of the next step may be longer than that of the previous step. This results in that desired compression can be obtained only by a fiber having a large $\gamma/\delta$ such as HNLF.

The following description is made in detail about the above-mentioned conclusion. Usually, the dispersion fiber has loss smaller than that of the nonlinear optical fiber and the fiber length is extremely short as shown in the table 1. Therefore, it is ignorable in terms of power loss.

First, when then optical pulse propagates through the optical pulse shaper 30 consisting of n optical propagation line units coupled including the optical propagation line units 3*a*, 3*b* and 3*c*, the compression ratio becomes $\alpha^n$. Then, the total length in the normalized space of the nonlinear optical fiber (total length in the fiber longitudinal direction, which is also referred to hereinafter) $\zeta_{An}$ is expressed by the equation 23 where $\zeta_0=0$.

$$\zeta_{An} = \sum_{k=1}^{n} (\zeta_{2k-1} - \zeta_{2k-2}) \qquad \text{[Equation 23]}$$

$$= \zeta_1 + \frac{\zeta_1}{\alpha} + \frac{\zeta_1}{\alpha^2} + \cdots + \frac{\zeta_1}{\alpha^{n-1}} = \frac{\alpha}{\alpha-1}\left(1 - \frac{1}{\alpha^n}\right)\zeta_1$$

When the nonlinear coefficient $\nu$ and loss coefficient $\delta$ of the nonlinear optical fiber are constant irrespective of the length in the fiber longitudinal direction, $a(z)=a(0)\exp[-\delta z]$ is obtained from the equation 8 and the equation 11 is used to express the relationship between the distance $\zeta$ in the normalized space and the real distance z by the following equation.

$$\zeta = a_0^2 \frac{\nu}{2\delta}(1 - e^{-2\delta z}) \qquad \text{[Equation 24]}$$

The equation 24 is used to express the real distance z considering loss coefficient $\delta$ by using the normalized distance $\zeta$ as follows.

$$z = -\frac{1}{2\delta}\ln\left(1 - \frac{2\delta}{a_0^2 \nu}\zeta\right) \qquad \text{[Equation 25]}$$

When $\zeta_1/\alpha^{n-1}$ is substituted to $\zeta$ obtained from the equation 25, the real distance (real distance in the fiber longitudinal direction) $z_n$ of the n-step nonlinear optical fiber is calculated. Then, the fiber length $z_{An}$ in the real space of the nonlinear optical fiber required for n-time compression can be obtained from the equation 26 substituting the equation 23 to the equation 25.

$$z_{An} = -\frac{1}{2\delta}\ln\left[1 - \frac{2\delta}{a_0^2 \nu}\frac{\alpha}{\alpha-1}\left(1 - \frac{1}{\alpha^n}\right)\zeta_1\right] \qquad \text{[Equation 26]}$$

Further, the power ratio $a^2(z_{An})/a_0^2$ of the output optical pulse to the input optical pulse (hereinafter, referred to as "power loss ratio") is expressed by the equation 27.

$$a^2(z_{An})/a_0^2 = e^{-2\delta z_{An}} = 1 - \frac{2\delta}{a_0^2 \nu}\frac{\alpha}{\alpha-1}\left(1 - \frac{1}{\alpha^n}\right)\zeta_1 \qquad \text{[Equation 27]}$$

For ease of explanation, $a_0=a(0)=1$ is given. However, generality is not lost. Then, the equation 25 gives relationship between the length $\zeta_1$ in the fiber longitudinal direction of the first-step nonlinear optical fiber 30*a*, compression ratio $\alpha$ and the number of steps n in the normalized space and the loss coefficient $\delta$, the nonlinear coefficient $\nu$ and the total length $z_{An}$ of the nonlinear optical fiber 3 in the real space.

For example, when the length $\zeta_1$ in the fiber longitudinal direction of the first-step nonlinear optical fiber 30*a*, the compression ratio $\alpha$ and the number of steps n are determined to present the conditions on the total length $z_{An}$, the conditions to be satisfied by the loss coefficient $\delta$ and the nonlinear coefficient $\nu$ are given. In a specific example, the above-described case of $\zeta_1=1.2$, $\alpha=1.97$ and $n=3$ is considered, and the total length $z_{An}$ is compared between use of HNLF ($\gamma=20$ $W^{-1}km^{-1}$, $L=1.5$ dB/km) as the nonlinear optical fiber and use of DSF (Dispersion Shifted Fiber) ($\gamma=20$ $W^{-1}km^{-1}$, $L=0.2$ dB/km) as the nonlinear optical fiber.

The constants to be used in normalization in the equations 6 and 7 are $z_0=1$ [km] and $P_0=1$ [W], and the equation 25 is used to calculate total lengths $z_{An}$ of the respective fibers. The total length $z_{An}$ of the HNLF is 0.12256 km and that of the DSF is 1.23443 km the residual power ratios of the HNLF and the DSF are 0.95855 (=$-1.5$ [dB/km]×0.12256 [km]=$-0.18384$ [dB]) and 0.94474 (=$-0.2$ [dB/km]×1.23443 [km]=$-0.246886$ [dB]), respectively (which can be also calculated by the equation 26), which shows that power loss for the HNLF is lower than that for the DSF. This result means that the loss coefficient $\delta$ is locally larger in the HNLF than that in the DSF, however in spite of this larger loss coefficient of the HNLF, the total length $z_{An}$ is sufficiently short and therefore, the power loss becomes totally less. On the other hand, if a tolerance of the power loss is set in realizing a pulse shaper, the pulse shaper can be realized with the HNLF, however sometimes not with the DSF.

Thus, as is seen from the calculation in terms of the total length in the longitudinal direction of the nonlinear fiber finer and the power loss, HNLF is used more advantageously than the DSF.

Experimental Result of Optical Pulse Shaping

The following description is made about experimental results of optical pulse shaping with use of a pulse shaper manufactured by the method disclosed in the present invention, that is, the pulse shaper designing method based on quasi-periodic stationary pulse propagation.

(Experimental Result 1)

A polarization-shifted pulse shaper of four-step configuration is used to compress the width of 40 GHz repetition inverted pulse train from 7 ps to 0.360 ps.

The peak power of the input pulse is 357 mW.

The compression ratio per step $\alpha$ is $(7/0.36)^{1/4}=2.1$.

Then, the pulse width and the peak power of each step of quasi-periodic stationary pulses are determined as shown in table 4.

TABLE 4

Pulse width and Peak power of each step

|  | Pulse width [ps] | Peak power [W] |
| --- | --- | --- |
| Input | 7 | 0.357 |
| 1st step output | 3.333 | 0.750 |
| 2nd step output | 1.587 | 1.574 |
| 3rd step output | 0.756 | 3.306 |
| 4th step output | 0.360 | 6.943 |

When design of any one step out of the four steps of the pulse shaper is decided, design of the other steps is determined soon.

Here, as design of the third step of the shaper is decided, quasi-periodic stationary pulses having the compression ratio $\alpha=2.1$ and the peak nonlinear phase shift of 2.4 rad are calculated.

Figure 21:
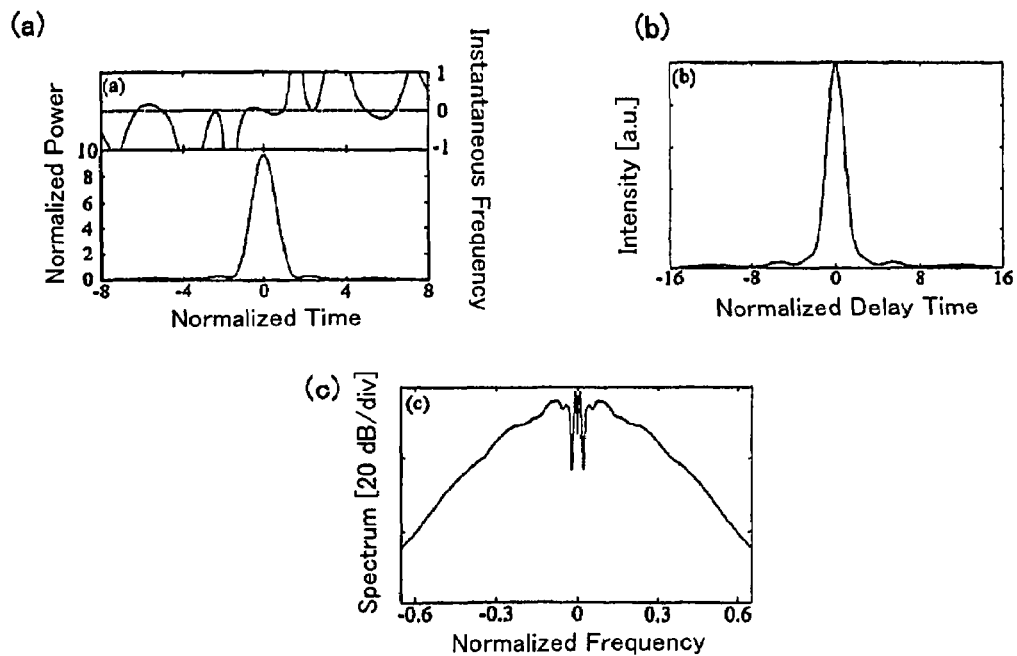
FIG. 21(a) is a graph of an intensity profile and a instantaneous frequency of a quasi-periodic stationary pulse waveform.
FIG. 21(b) is a graph of autocorrelation of the quasi-periodic stationary pulse waveform.
FIG. 21(c) is a graph of spectrum of the quasi-periodic stationary pulse waveform.

In the transmission path in the normalized space, $s_1=-0.0824$, $s_2=118.17$, $\zeta_{1=0.25}$, and $\zeta_2=0.25213$ are set and quasi-periodic stationary pulses having $\alpha=2.1$ and the peak power 9.6 were calculated by averaging. The waveform thereof is illustrated in FIG. 21. FIG. 21(a) illustrates intensity-time waveform and instance frequency, FIG. 21(b) illustrates auto-correlation trace and FIG. 21(c) illustrates spectrum.

The power full width at half maximum (FWHM) of quasi-periodic stationary pulses shown in FIG. 21 is 1.442.

In the pulse shaper including (HNLF) and (SMF) in the real space, the lengths of respective fibers are determined so that the pulses on FIG. 21 can propagate.

The dispersion value, nonlinear coefficient and loss of each of the HNLF and the SMF are shown in the table 5.

TABLE 5

Parameters of fiber to be used

|  | HNLF | SMF |
| --- | --- | --- |
| Dispersion value [ps/nm/km] | −0.3 | 16.3 |
| Nonlinear coefficient [1/W/km] | 19.8 | 1.3 |
| Loss [dB/km] | 1.65 | 0.2 |

In first consideration, loss is neglected.

When the transmission path parameters in the normalized space and quasi-periodic stationary pulse parameters are replaced with the fiber parameters shown in the table 5 and pulse parameters in the real space shown in the table 4, the lengths of the HNLF and the SMF of the third-step pulse shaper are 77 m and 14.7 m, respectively.

With use of these values, the fiber lengths of the first second and fourth steps are calculated by the above-described conversion, which is listed in the table 6a.

TABLE 6

Design of 4-step pulse shaper without consideration of loss

|  | HNLF length [m] | SMF length [m] |
| --- | --- | --- |
| 1st step | 339.6 | 285.9 |
| 2nd step | 161.7 | 64.8 |
| 3rd step | 77.0 | 14.7 |
| 4th step | 36.7 | 3.33 |

If there is no fiber loss and connection loss between HNLF and SMF, the pulse shaper can be produced as designed in the table 6.

However, actually, as attenuation of optical power due to the losses have a large influence, a given nonlinear phase shift amount of each step is not obtained and desired compression characteristics are not achieved unless designing is performed in consideration of the losses.

Then, the designing of the table 6 is reviewed in consideration of the fiber loss and the connection loss between the HNLF and the SMF.

After measurement, the connection loss between the HNLF and the SMF is calculated 0.15 dB as typical value per connection.

As a method for compensating for optical power attenuation due to fiber loss to realize predetermined nonlinear phase shift amounts at respective steps, there are a method of amplifying attenuated optical power with use of a configuration of an optical amplifier built in the pulse shaper and a method of elongating the HNLF length in accordance with the attenuated power.

Here, the latter method is adopted to adjust the HNLF length of each step so that the peak nonlinear phase shift affecting pulses at each step of the pulse shaper becomes predetermined 2.4 rad.

The design result of elongated HNLF lengths of respective steps designed in consideration of loss is shown in the table

TABLE 7

Design of 4-step pulse shaper in consideration of loss (fiber loss and connection loss 0.15 dB between HNLF and SMF)

|  | HNLF length [m] | SMF length [m] |
| --- | --- | --- |
| 1st step | 364.1 | 285.9 |
| 2nd step | 210.1 | 64.8 |
| 3rd step | 114.4 | 14.7 |
| 4th step | 60.4 | 3.33 |

When the result in the table 7 is compared with that in the table 6, it is seen that the HNLF length of each step in the table 7 is longer.

Figure 22:
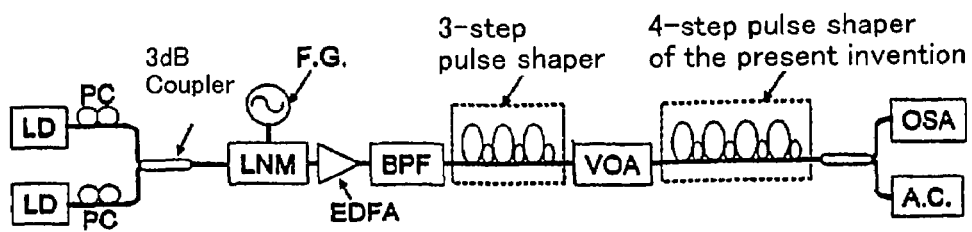
FIG. 22 is a view illustrating an experiment system of pulse shaping experiment.

The experimental system is illustrated in FIG. 22.

Continuous light beams emitted from two DFB lasers (LDs) having different oscillation wavelengths by 0.32 nm (40 GHz in terms of frequency) around 1550 nm are both made to pass through respective polarization controllers (PC)

and a 3 dB coupler to be combined into beat light having a repetition frequency of 40 GHz.

The beat light is made to pass a LN phase modulator (LNM), which is driven by 1 GHz sine wave obtained from a function generator (F.G.), thereby to be subjected to 1 GHz phase modulation.

This phase modulation is used to suppress Stimulated Brillouin Scattering (SBS) in the fiber. Here, in addition to phase modulation by the phase modulator, suppression of SBS is also possible by inserting at least one optical isolator at an appropriate portion in the pulse shaper.

Light output from the LNM is amplified by an EDFA (Erbium doped fiber amplifier) and then made to pass through a band pass filter (BPF) where amplified spontaneous emission (ASE) noise is eliminated before the light is input to the three-step pulse shaper.

This three-step pulse shaper is disclosed in "Wideband-tunable highly pure 40 GHz picosecond soliton train generation by short comb-like profiled fiber", (K. Igarashi et al., CLEO2004, paper CFC2, San Francisco, Calif., U.S.A., May 2004).

Output light of the three-step pulse shaper has a pulse train of which adjacent pulses are of opposite phase, repetition frequency is 40 HJz, the power FWHM is 7 ps and the waveform is sech function.

After average optical power is adjusted to be 21.13 dBm by a variable optical attenuator (VOA), its pulse train is input to the pulse shaper designed in accordance with the present invention to calculate a spectral waveform and autocorrelation trace of each step by an optical spectrum analyzer (OSA) and an autocorrelation trace measurement unit (A.C.).

Further, on the same conditions as those in the experiment, numerical simulation is performed on pulse shaping and the simulation result is compared with the experimental result.

However, the numerical simulation is performed on light wave of single linear polarization and does not consider effects of fiber higher-order dispersion, higher-order nonlinearity and birefringence.

Figure 23:
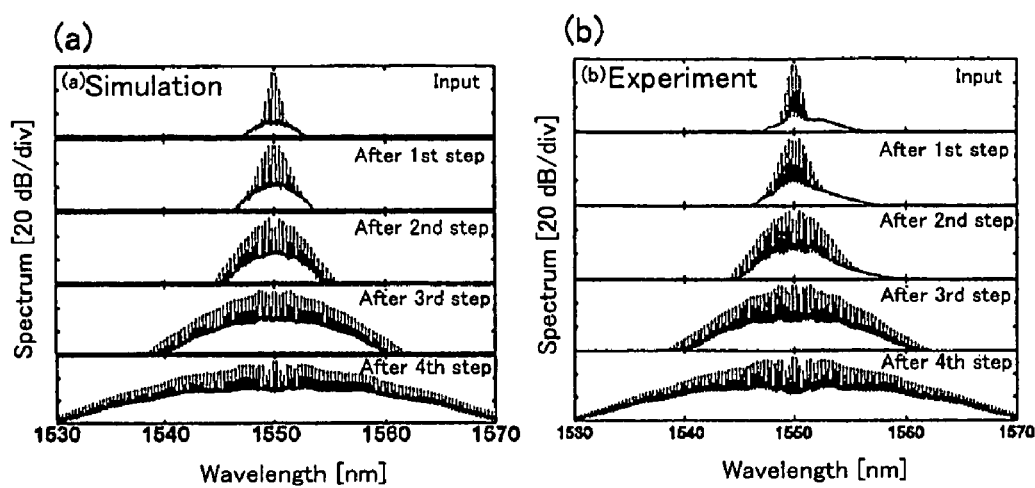
FIGS. 23(a) and 23(b) are graphs of spectrum of input and output pulses of plural steps, and specifically.
Figure 24:
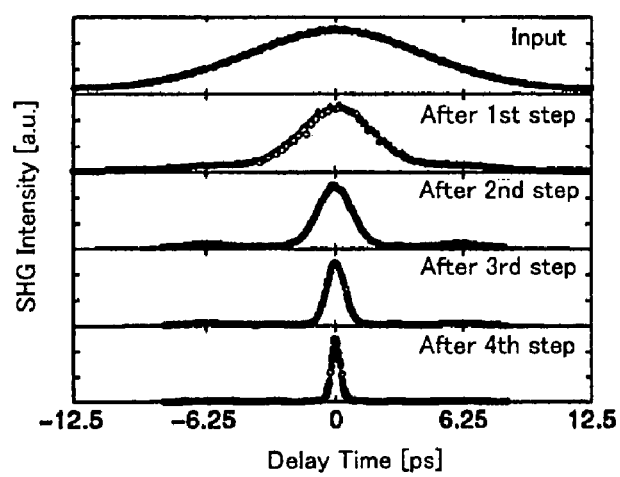
FIG. 24 is a graph of autocorrelation of input and output pulses of plural steps (the numerical simulation result is shown by a line and the experimental result is shown by dots)

Of these simulation and experimental results, FIGS. 23 and 24 illustrate a spectral waveform and an autocorrelation trace of each-step output pulse, respectively. In other words, FIG. 23(a) illustrates the numerical simulation result, while FIG. 23(b) illustrates the experimental result. FIG. 24 illustrates the numerical simulation result by solid line and the experimental result by dots.

In addition, theoretical values, the numerical simulation result and the experimental result of pulse width (power FWHM) of output pulse of each step are listed in the table 8.

The theoretical values are those obtained by the equation $7'\alpha^{-n}=7'2.1^{-n}$ in which an input value is 7 ps and the number of steps is n. On the other hand, the experimental values are those obtained by subjecting the autocorrelation trace obtained in FIG. 24 to sech function fitting for input pulses and intensity autocorrelation function of Gauss function for output pulses of every step thereby to derive FWHM.

TABLE 8

Theoretical value, Numerical calculation value and Experimental value of input pulse and each-step output pulse

|  | Theoretical value [ps] | Numerical calculation value [ps] | Experimental value [ps] |
| --- | --- | --- | --- |
| Input | 7 | 7.20 | 7.06 |
| 1st step output | 3.333 | 3.44 | 3.24 |
| 2nd step output | 1.59 | 1.59 | 1.49 |
| 3rd step output | 0.756 | 0.766 | 0.767 |
| 4th step output | 0.360 | 0.367 | 0.375 |

As is seen from FIGS. 23 and 24, the experimental result and the simulation result present accurate accordance. In addition, as is seen from the table 8, the pulse width is compressed almost like in the theory.

Further, when attention is paid to the waveform of the fourth-step output pulse, both of the spectrum and autocorrelation trace are similar to those of quasi-periodic stationary pulses shown in FIG. 21.

The shape of input pulses is like sech function, and does not accord with that of quasi-periodic stationary pulses exactly. However, it is seen from the similarity of the compressed pulse waveform to the waveform of quasi-periodic stationary pulses that the pulses are compressed into quasi-periodic stationary pulses in a stationary state while propagating through the pulse shaper.

In consideration of this, if the step number of the pulse shaper is further increased, the pulse waveform asymptotically approaches quasi-periodic stationary pulse waveform with more accuracy.

Meanwhile, of the fourth-step output pulses, the spectral band of the experimental result is slightly narrower than that of the simulation result.

One of causes of the narrower band is influence of polarized wave.

In the numerical simulation as to pulse propagation in the pulse shaper, it is assumed that optical pulses are always single polarized wave and the polarized wave is maintained by the neglect of birefringence.

However, actually, the effect of birefringence of the fiber causes the optical wave, which is single polarized wave when being input, to be divided into two polarized light components orthogonal to each other, and group delay of these light components result in increase inn pulse width and decrease of peak power.

This effect is known as polarization mode dispersion (PMD).

When the peak power of the pulses is lowered, it becomes difficult to attain a desired peak nonlinear phase shift at a certain step of the pulse shaper, a thereby outputting pulses of large time width and narrow band.

If the pulse shaper is configured of more steps of fibers, the influence of PMD becomes relatively larger due to the small pulse width so that it becomes difficult to achieve a desired compression characteristic.

In view of this, designing of the pulse shaper is required to be performed in consideration of birefringence in addition to fiber loss and connection loss so as to experimental result as designed.

Next description is made about the relationship between noise added to pulses when being input to the shaping device and the timing jitter of the pulse train of output light.

FIG. 24 illustrates autocorrelation traces of output pulses of every step when the delay time ranges from −12.5 ps to 12.5 ps.

Then, the autocorrelation traces of output pulses of every step at the delay time ranging from −30 ps to 30 ps are illustrated in terms of experimental result (dots) and the numerical simulation result (lines).

Figure 25:
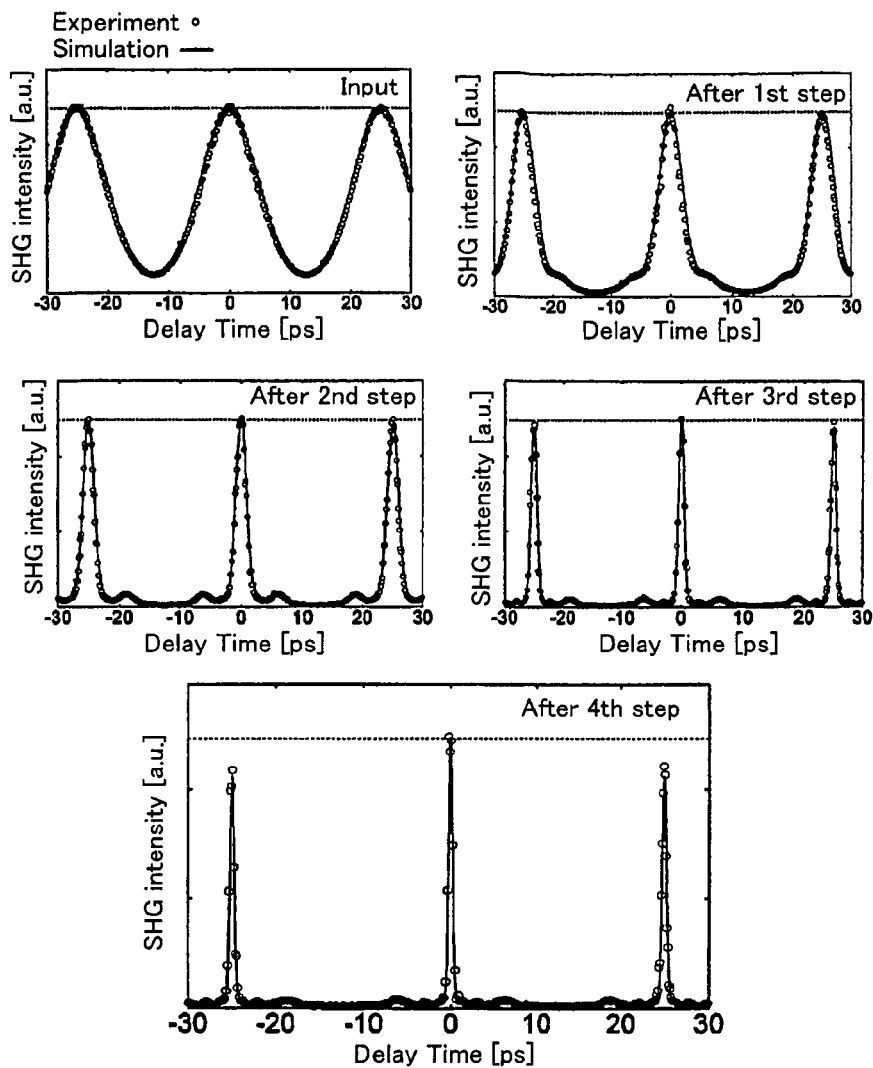
FIG. 25 shows graphs of autocorrelation of input and output pulses of plural steps (the numerical simulation is shown by dots and the experimental result is shown by a line)

FIG. 25 illustrates the autocorrelation traces of output pulses of every step, in which the dots are of experimental result and the lines are of the numerical simulation result.

The peaks of the autocorrelation traces are at the delay time of −25, 0, 25 ps. For the higher step, the peak value decreases at the delay time of −25, 25 ps.

This decrease of the peak value means the 40 GHz pulse train has timing jitter (time position fluctuation).

Causes of this timing jitter are cited below.

When optical pulses have ASE noise added thereto, the optical pulse waveform is distorted by interference between the pulses and noise components, this distortion is random for time slots.

This distortion is outstanding when the added ASE (high-frequency noise component) is of frequency away from the center frequency of the optical pulses.

As a result of pulse waveform distortion, the pulse first moment (the center of pulse position) in the time axis becomes random for time slots (jitter is included).

Meanwhile, the pulse width is compressed by the pulse shaper of this invention, the peak position of the output pulses almost matches the center position of the input pulses, which is shown in the simulation result.

When the output pulses of respective steps of the pulse shaper are calculated in the numeric simulation, standard deviation, which is deviation from the time-slot center position, of the first moment and peak position of the pulses in the pulse train in the time axis are calculated, and the first moment standard deviation and peak position standard deviation of input pulses and output pulses of the respective steps are listed in the table 9.

TABLE 9

| Steps | First moment standard deviation [fs] | Peak position standard deviation [fs] |
|---|---|---|
| Input | 67.88 | 311.5 |
| 1st step output | 69.43 | 102.3 |
| 2nd step output | 70.30 | 87.51 |
| 3rd step output | 70.56 | 86.71 |
| 4th step output | 70.64 | 86.90 |

As is seen from the table 9, the peak standard deviation of the input pulses is larger because the interference with the noise distorts the waveform.

However, at the step of the pulse shaper is higher, the first moment standard deviation hardly varies while the peak standard deviation becomes closer to the first moment standard deviation.

The pulse timing jitter deteriorates the quality of the pulse train as the ratio of pulses to FWHM is larger.

In other words, when the timing jitter is kept at a constant value, the jitter presents almost no problem as the pulse width is larger, while the jitter becomes relatively larger as the pulse width is smaller.

For example, for input pulses, since the standard deviation of the first moment is 67.9 fs while the width is 7 ps, jitter is negligible. In the autocorrelation trace of FIG. 25, the peak values at the delay time of −25, 25 ps are almost the same the peak value at the delay time of 0 ps.

On the other hand, for the fourth-step output pulses, s the standard deviation of the first moment is 70.6 fs while the width is 367 ps, jitter is larger relative to the width and thereby, in the autocorrelation trace of FIG. 25, the peak values at the delay time of −25, 25 ps are smaller than the peak value at the delay time of 0 ps.

Accordingly, in order to prevent the influence of the timing jitter of the output pulses in compressing pulse width by the pulse shaper, it is very important to reduce to a minimum the timing jitter amount of the input pulses, or in other words, the jitter amount of the first moment in the time axis.

In order to achieve this reduction, a method is effective of removing ASE noise (particularly, high-frequency noise components) by a BPF in amplifying light by the EDFA.

As another effective method, after EDFA is used to amplify two LD for emitting beat light in FIG. 22 to output enough optical power, the narrow band NPF is used to remove noise of the two amplified light beams to a minimum and the two light beams are combined, and then, optical amplification with addition of noise is performed or optical amplification with no noise added is performed.

(Experimental Result 2: Pulse Shaper Using Polarization Maintaining Fiber)

As another example, a pulse shaper designed by the method according to the present invention is implemented by polarization-maintaining HNLF and SMF.

The pulse shaper is designed to have four-step configuration in which an input pulse width of 8 ps is compressed into 2 ps.

The peak power of the input pulses is set at 420 mW.

Design is performed such that the compression ratio of each step is $\alpha=1.4$ and quasi-periodic stationary pulses of which the peak nonlinear phase shift is 1 rad are propagated.

The pulse width and peak power of quasi-periodic stationary pulses in respective steps are summarized in the table 10.

TABLE 10

| Width and Peak power of quasi-periodic stationary pulse of each step | | |
|---|---|---|
| Steps | Pulse width [ps] | Peak power [w] |
| Input | 8 | 0.420 |
| 1st step output | 5.71 | 0.588 |
| 2nd step output | 4.08 | 0.823 |
| 3rd step output | 2.92 | 1.152 |
| 4th step output | 2.08 | 1.613 |

In the propagation line shown in FIG. 3, quasi-periodic stationary pulses having $s_1=-0.024$, $s_2=6.92$, $\zeta_1=1$, $\zeta_2=1.08$, $\alpha=1.4$ and the peak power is 1 are calculated by averaging.

Figure 26:
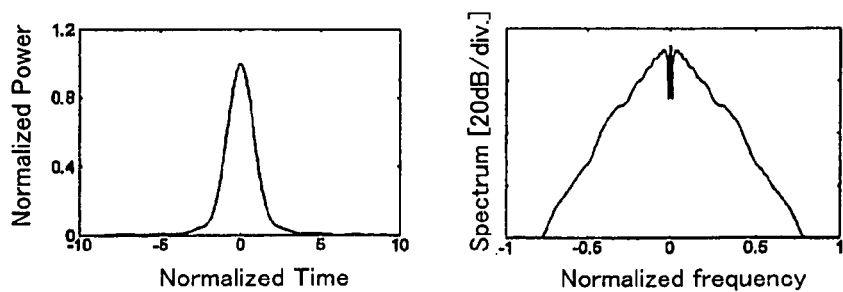
FIG. 26 shows graphs of waveforms of quasi-periodic stationary pulses.

FIG. 26 shows the waveform of this quasi-periodic stationary pulse, time intensity waveform and spectral waveform.

The power FWHM of the quasi-periodic stationary pulses shown in FIG. 26 is 1.974.

The parameters of the polarization maintaining HNLF and SMF are summarized in the table 11.

TABLE 11

| Parameters of fiber to be used | | |
|---|---|---|
|  | HNLF | SMF |
| Dispersion value [ps/nm/km] | −0.576 | 17.14 |
| Nonlinear coefficient [l/W/km] | 10.86 | 1.12 |
| Loss [dB/km] | 0.9 | 0.27 |

As is the method used in the previous example, first consideration is given with the neglect of loss.

In the four-step pulse shaper, design of the second step is decided.

When the normalized-space transmission path parameters and quasi-periodic stationary pulse parameters are replaced with fiber parameters shown in the table 11 and real-space pulse parameters shown in the table 10, the lengths of the second-step HNLF and SMF are 164.3 m and 212.1 m, respectively.

With use of this, the fiber length of the first, third and fourth step fibers are calculated by the above-described conversion, which are summarized in the table 12.

TABLE 12

Design of 4-step pulse shaper without consideration of loss

| | HNLF length [m] | SMF length [m] |
|---|---|---|
| 1st step | 230.0 | 415.7 |
| 2nd step | 164.3 | 212.1 |
| 3rd step | 117.3 | 108.2 |
| 4th step | 83.8 | 55.2 |

The fiber loss shown in the table 111 and connection loss of HNLF and SMF are considered in the pulse shaper designing, which result is shown in the table 13.

Here, the connection loss of HNLF and SMF is 0.6 dB for each connection as typical value, which is obtained by the measurement.

TABLE 13

Design of 4-step pulse shaper in consideration of loss (fiber loss and connection loss 0.6 dB between HNLF and SMF)

| | HNLF length [m] | SMF length [m] |
|---|---|---|
| 1st step | 271.6 | 415.7 |
| 2nd step | 277.8 | 212.1 |
| 3rd step | 284.9 | 108.2 |
| 4th step | 296.9 | 55.2 |

In designing with the fiber loss and connection loss of HNLF and SMF neglected, the HNLF length becomes shorter for higher step as shown in the tables 6 and 12.

Besides, even when these losses are taken into consideration, if the losses are relatively small, the HNLF length becomes shorter for higher step as shown in design result of the table 7.

However, when the connection loss of HNLF and SMF is relatively large, for example, 0.6 dB, the HNLF length becomes longer as shown in the table 13.

The design shown in the table 13 is used as a basis to produce the pulse shaper and pulse compression experiment is performed.

Figure 27:
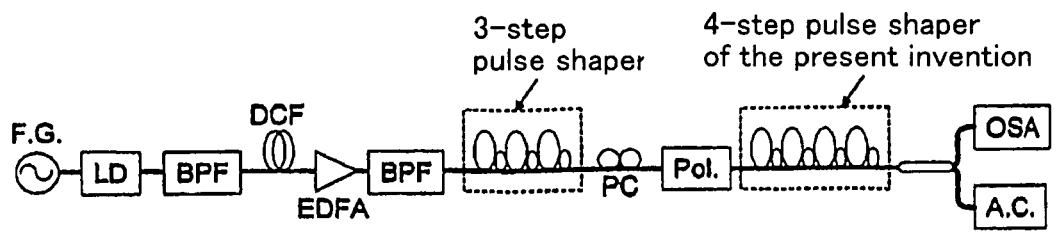
FIG. 27 is a view illustrating an experiment system of pulse shaping experiment.

The experiment system is illustrated in FIG. 27.

When a sinusoidal clock signal of 508 MHz generated from a function generator (F.G.) is applied to a direct modulation DFB laser (LD), gain switch operation is performed to generate an optical pulse train of repetition frequency of 508 MHz.

This optical pulse includes two frequency components having center frequencies of 1553 nm and 1551 nm, and the latter component is suppressed by the BPF.

An output pulse form the BFP has frequency chirp, however, the chirp is compensated by making the pulse propagate through a DCF of 600 m thereby to obtain a pulse with a width of 13.3 ps.

This pulse is amplified by the EDFA, made to pass through the BPF having a bandwidth of 3 nm for removing noise, and then, input to a three-step pulse shaper thereby to obtain a pulse with a width of 8 ps.

The polarization controller is adjusted so that an optical pulse of single linear polarization obtained after passing through the polarizer (Pol.) has average power of 1.8 dBm, and then, the pulse is input to a four-step pulse shaper including a polarization maintaining fiber manufactured according to the present invention.

Optical spectra and autocorrelation traces of the input pulse and output pulses of respective steps are measured and its experimental results are shown with the numeral simulation results.

Figure 28:
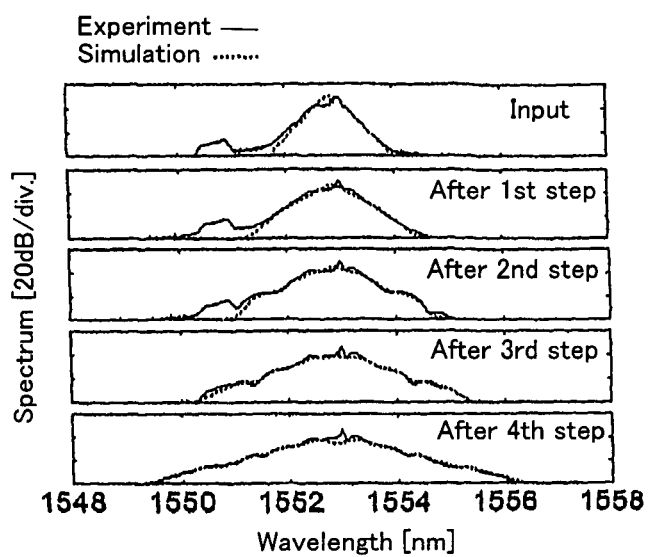
FIG. 28 is a graph of spectrum of input and output pulses of plural steps (the experimental result is shown by a solid line and the numerical simulation result is shown by a dotted line)

FIG. 28 shows spectra of the input pulse and output pulses of respective steps (solid line: experimental results, broken line: numeral simulation results).

Figure 29:
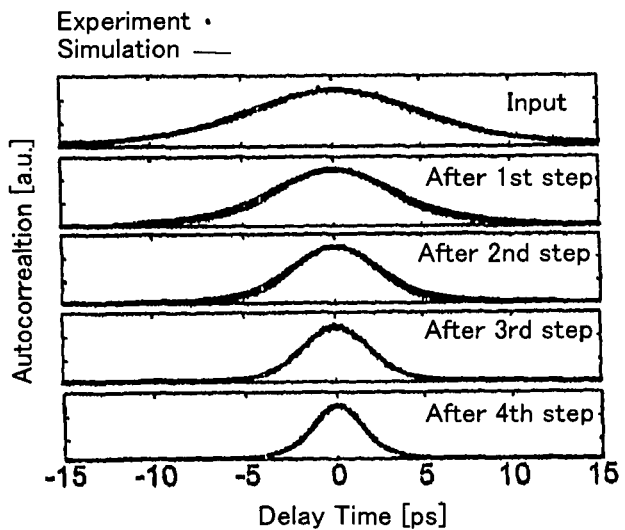
FIG. 29 is a graph of autocorrelation of input and output pulses of plural steps (the numerical simulation result is shown by a line and the experimental result is shown by dots)

FIG. 29 shows autocorrelation traces of the input pulse and output pulses of respective steps (dot: experimental results, line: numeral simulation results).

FIG. 28 shows the spectra of the input pulse and output pulses of respective steps in which experimental results are indicated by solid lines, numeral simulation results are indicated by broken lines).

Besides, FIG. 29 shows the autocorrelation traces of the input pulse and output pulses of respective steps in which experimental results are indicated by dots, numeral simulation results are indicated by lines).

As is seen from these figures, the experimental results are in good agreement with the simulation results.

In addition, of FWHMs of pulse outputs of the respective steps, theoretical values, calculation values obtained by numeral simulation and experimental values are shown in the table 14.

TABLE 14

Theoretical value, Numerical calculation value and Experimental value of input pulse and each-step output pulse

| | Theoretical value [ps] | Numerical calculation value [ps] | Experimental value [ps] |
|---|---|---|---|
| Input | 8 | 8 | 7.51 |
| 1st step output | 5.71 | 5.76 | 4.89 |
| 2nd step output | 4.08 | 4.15 | 3.56 |
| 3rd step output | 2.92 | 3.01 | 2.91 |
| 4th step output | 2.08 | 2.15 | 2.23 |

From the table 14, it can be seen that pulse compression was performed almost as designed.

As described above, with the pulse shaper using a polarization non-maintaining fiber, the bandwidth obtained by experiment of the spectrum of the fourth-step pulse output is smaller than that obtained by simulation, which is shown in FIG. 23.

However, in the fourth-step output spectrum profile in FIG. 28, the experimental result and the simulation result are in close agreement.

This seems to be because of using a polarization maintaining fiber in the pulse shaper.

Specifically, as the polarization was always maintained while a pulse train propagated in the shaping device, there did not occur adverse influence of birefringence such as PMD and therefore pulse propagation characteristics as calculated could be obtained.

Consequently, by the pulse shaper using a polarization maintaining fiber being manufactured, the operation as designed can be realized, which presents an advantage in manufacturing of the pulse shaper.

In conclusion, as applications of the optical pulse shaper 30 of this embodiment, the feasibility of a waveform shaping device, an adiabatic pulse expanding device, a parabolic self-similar pulse generator and dispersion management propagation which does not require an optical fiber of normal dispersion is described.

<Feasibility of Waveform Shaping Device>

As described above, in this embodiment, adiabatic compression using a quasi-periodic stationary pulse compressed per step has been described. As shown in the specific design examples, even if an optical pulse not in perfect agreement to a quasi-periodic stationary pulse is input, the pulse can become close to a stationary pulse by propagating through plural steps, which is shown in the numeral simulation results of FIGS. 16 and 19, the experimental results shown in FIGS. 23, 24, 28 and 29 and the calculation results by the simulation. With use of this, when a pulse of waveform distorted for some reason is input, the pulse is made close to a stationary pulse so that the waveform is shaped properly. If frequency band control using an optical filter or the like is applied at any point, it becomes possible to realize a waveform shaping device with excellent efficiency, which is effective on optical transmission accompanied with waveform distortion.

<Feasibility of Adiabatic Pulse Expanding Device>

As described above, in this embodiment, adiabatic compression using a quasi-periodic stationary pulse compressed per step has been described. In the description, as a process of adding perturbation of order O(1), the nonlinear effect is added by a nonlinear optical fiber 30a and the like, which is followed by adding the dispersion effect by a dispersion optical fiber 31a and the like. However, if, in another process of adding perturbation of order O(1), the anomalous dispersion effect is first added and then, the nonlinear effect is added, it is estimated that there is found a quasi-periodic stationary pulse having width expanded per step. Then, the compression ratio $\alpha$ in variable transformation of the equation 14 is 0 or larger and less than 1. With use of this, it becomes possible to manufacture an "adiabatic pulse expanding device" for expanding pulse width per step without causing energy loss other than fiber loss. Conventionally, the pulse width was expanded mainly by use of a band pass filter, which caused energy loss. However, the method using an optical pulse outputting device 100 is used thereby to solve the energy loss problem dramatically.

<Feasibility of Parabolic Self-Similar Pulse Generator>

Further, in an process of adding perturbation of order O(1), if the normal dispersion effect is first added and then, the nonlinear effect is added, it is estimated that a parabolic pulse can be obtained as a stationary solution. This is because a pulse having linear up-chirp caused by the normal dispersion further experiences up-chirp by the nonlinear effect and the waveform which can be the possible stationary solution is thought to be a parabola. Then, the compression ratio $\alpha$ in variable transformation of the equation 14 is also 0 or larger and less than 1. When design is made with the compression ratio close to 1, it is thought to be close to the phenomenon of self-similar parabolic pulse propagation as known by the documents "Parabolit pulse generation by use of a dispersion-decreasing fiber with normal group-velocity dispersion" T, Hirooka et al, Optics letters, vol. 29, no. 5, pp. 498-500, 2004) and "Self-Similar Propagation and Amplification of Parabolic Pulses in Optical Fibers" M. E. Fermann et al., Physical Review Letters, vol. 84, no. 26, pp. 6010-6013, 2000).

<Feasibility of Dispersion Management Propagation which does not Require an Optical Fiber of Normal Dispersion>

Dispersion management propagation is allowed by compensating up-chirp due to the nonlinear effect by the anomalous dispersion. As the optical pulse width is compressed per step, the width is required to be returned to its original state by band limit optical filter or the like.

As described up to this point, according to the optical pulse shaper 30 according to this embodiment, as optical pulses u11 (t), u12 (t) and u13 (t) input to the nonlinear optical fibers 30a, 30b and 30c, respectively, are similar waveforms, an optical pulse finally output from the optical pulse shaper 30 has a waveform with peak-to-pedestal ratio approximately the same to that of an optical pulse waveform input to the optical pulse shaper 30. This allows sufficient suppression of deterioration (distortion) occurring in the pulse waveform of the optical pulse output from the optical pulse shaper 30 thereby to enable a highly accurate optical pulse train of to be output.

In addition, when the optical pulse shaper 30 according to this embodiment is used, a compression ratio per step can be larger thereby allowing much more efficient pulse shaping than the conventional adiabatic compression system.

Further, when dispersion values $s_1$ and $s_2$ and lengths in the fiber longitudinal direction $\zeta_1$ and $\zeta_2$ of the first optical propagation line unit 3a and a power peak value of an optical pulse input to the first optical propagation line unit 3a are determined, the dispersion values and lengths in the fiber longitudinal direction of the second and third optical propagation line units concatenated as subsequent steps to the dispersion optical fiber 31a of the first optical propagation line unit 3a can be determined uniquely, which facilitates designing of the optical pulse outputting device 100 (particularly of the optical pulse shaper 30).

Furthermore, when the dispersion value of the nonlinear optical fiber 30a of the first optical propagation line unit 3a is zero or close to zero, the dispersion values of nonlinear optical fibers 30b and 30c of the second and third optical propagation line units, respectively, are almost identical to the dispersion value of the nonlinear optical fiber 30a of the first optical propagation line unit 3a (that is, zero or close to zero), and accordingly, designing of the optical pulse shaper 30 is further facilitated.

Here, the description of this embodiment has been made to show an example of the optical pulse shaper and its designing method of the present invention, and is not for limiting the present invention. The detail configuration, the detail operation and the like of the optical pulse shaper 30 described in the present embodiment can be modified appropriately without departing from the intent of the present invention.

For example, this embodiment does not consider optical fiber high-order dispersion, high-order nonlinearity, polarization mode dispersion and the like, however, the high-order dispersion, high-order nonlinearity, polarization mode dispersion can be taken into account by modifying the equation 1. Particularly, when an optical pulse having a compressed smaller width is made to propagate, the influence of dispersion slope (third-order dispersion) has to be take into consideration. However, if the dispersion slopes of a nonlinear optical fiber and a dispersion optical fiber are opposite to each other, the influence by the two dispersion slopes can be cancelled.

In addition, a medium for offering the nonlinear effect is not limited to the nonlinear optical fibers 30a, 30b and 30c, however, any other medium that has a refractive index proportional to the electric field intensity, such as a photonic crystal fiber or another waveguide device may be utilized. Besides, a medium offering the anomalous dispersion is not limited to the single-mode dispersion optical fibers 31a, 31b and 31c, however, high-order mode fiber (see "Dispersion Management with Higher Order Mode Fibers" S. Ramachandran, OECC 2003, paper 15D4-1, Shanghai, China October 2003), Fiber Bragg gratings (FBG), wavelength dispersion medium in the space using prism and the like may be utilized.

Further, on the contrary to spreading of the optical spectrum accompanied with up-chirp due to the nonlinear effect, taken into consideration are the case where the optical spectrum is spread by down-chirp or for example there case where after propagating through the nonlinear optical fiber, there occurs idler light due to parametric process of pump light in any nonlinear medium (i.e. optical fiber) and optical pulses. In this case, as the phase is inverted the above-described state is obtained however, the medium offering dispersion used (i.e. optical fiber) is not anomalous dispersion medium but is normal dispersion medium.

Furthermore, as design is made in such a manner that wavelength conversion is performed at any point in the optical pulse shaper 3, the optical pulse shaper 3 can have a readily wavelength-tunable configuration.

Figure 14:
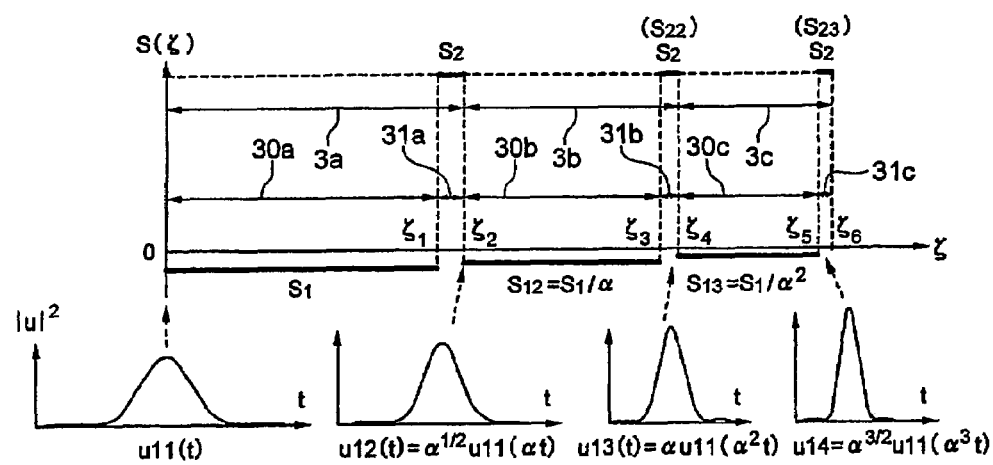
FIG. 14 is a schematic diagram of dispersion map and behaviors of quasi-periodic stationary pulses obtained by varying the fiber length of a dispersion optical fiber in the dispersion map of FIG. 13.
Figure 15:
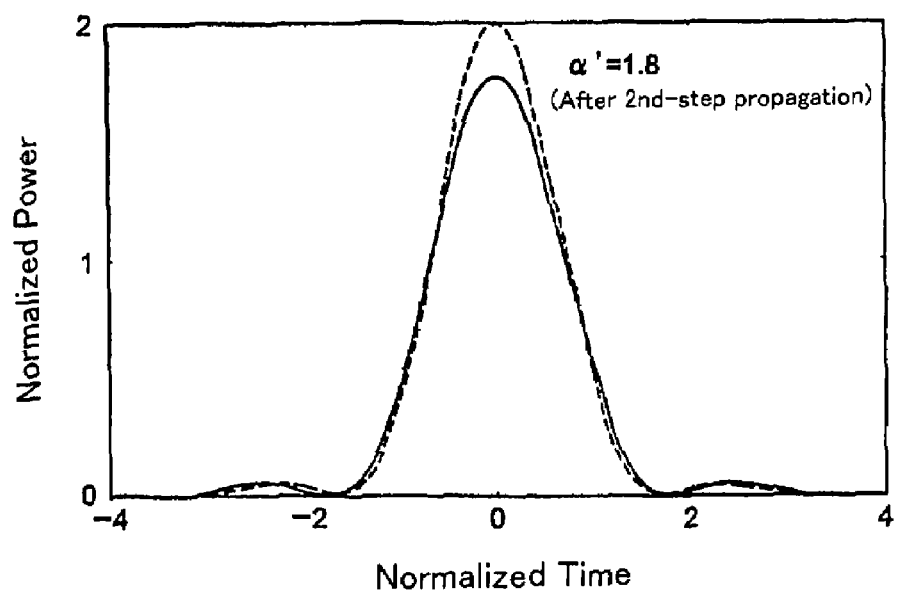
FIG. 15 is a graph of the waveform of an optical pulse after propagating in two steps of an optical pulse shaper designed with a compression ratio of 1.8.
Figure 16:
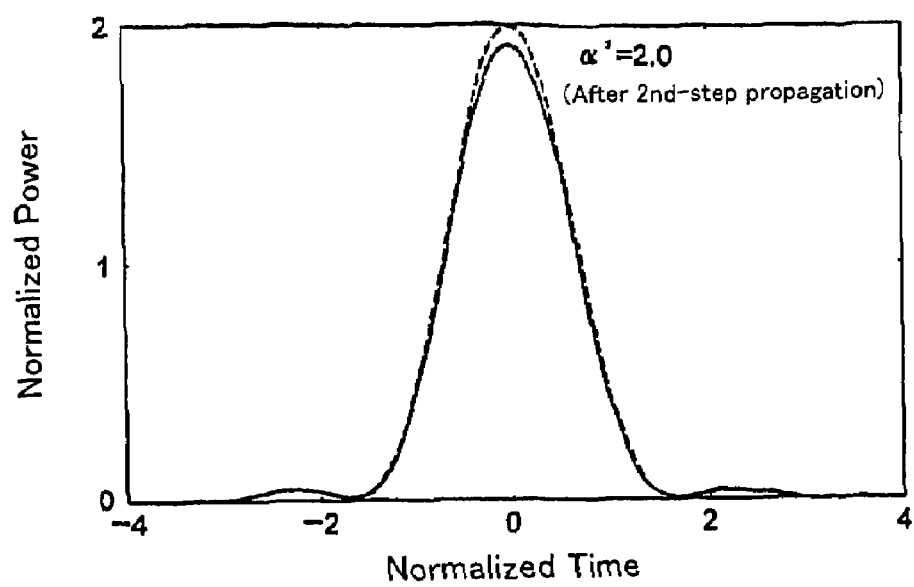
FIG. 16 is a graph of the waveform of an optical pulse after propagating in two steps of an optical pulse shaper designed with a compression ratio of 2.0.
Figure 17:
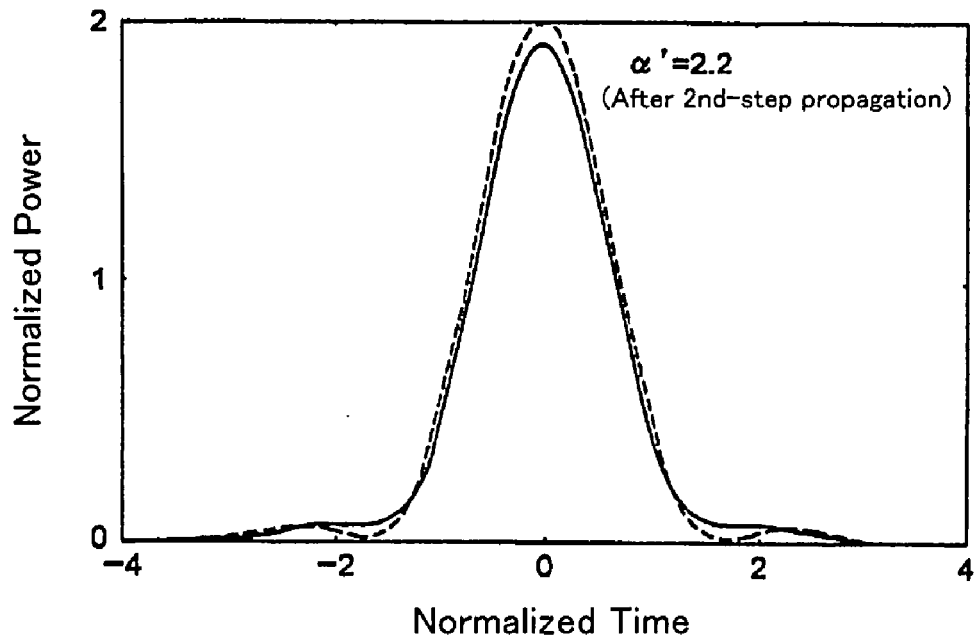
FIG. 17 is a graph of the waveform of an optical pulse after propagating in two steps of an optical pulse shaper designed with a compression ratio of 2.2.
Figure 18:
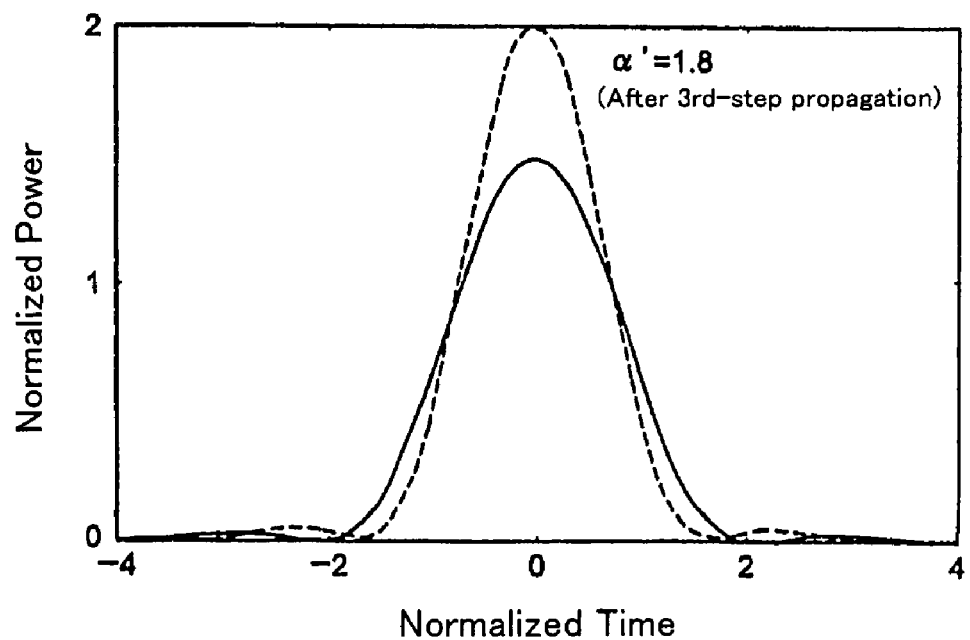
FIG. 18 is a graph of the waveform of an optical pulse after propagating in three steps of an optical pulse shaper designed with a compression ratio of 1.8.
Figure 19:
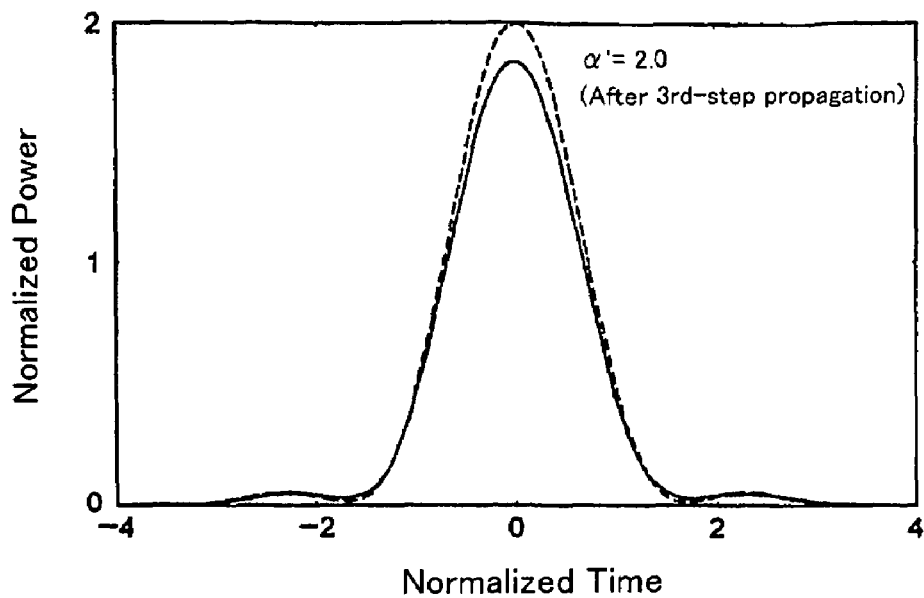
FIG. 19 is a graph of the waveform of an optical pulse after propagating in three steps of an optical pulse shaper designed with a compression ratio of 2.0.
Figure 20:
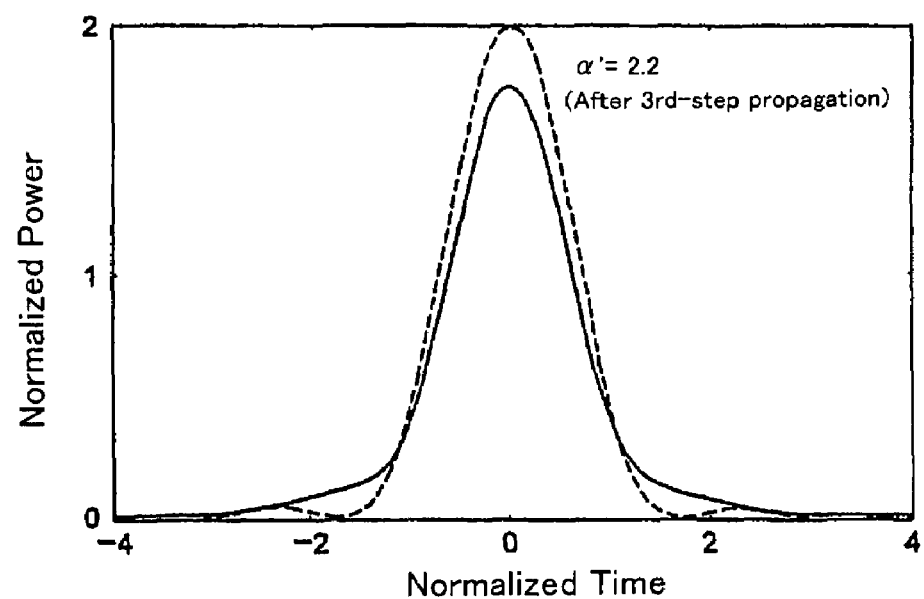
FIG. 20 is a graph of the waveform of an optical pulse after propagating in three steps of an optical pulse shaper designed with a compression ratio of 2.2.

Still furthermore, the configuration shown in FIGS. 13 and 14 of the optical pulse shaper 30 includes at least a one-step propagation line (first optical propagation line unit 3a or the like). This one-step propagation line may be concatenated as a subsequent step to another propagation line that can generate different quasi-periodic stationary pulses. For example, the compression ratio of the first step propagation line is $\alpha=1.5$ and that of the second step propagation line may be $\alpha=2.0$.

Still furthermore, parameters of an input optical pulse are preferably close to those of a numerically obtained quasi-periodic stationary pulse, and an optical propagation line (the optical propagation line units 3a, 3b and 3c) is preferably designed based on the dispersion map shown in FIGS. 13 and 14. However, as any parameter shift has a high margin, even if designing is not made exactly, an optical pulse outputting device 100 can be realized.

Still furthermore, a method of making an input optical pulse close to a quasi-periodic stationary pulse actually in manufacturing an optical pulse shaper 30 is described below. As this method, there are roughly divided two approaches; one is for making the pulse intensity to the intensity of the quasi-periodic stationary pulse, and the other is for making the chirp close to that of the quasi-periodic stationary pulse. In the former approach, an output of an optical amplifier may be adjusted, or the intensity modulator or another optical pulse shaper 30 may be provided separately so that the peak power and time width or pedestal shape of the input pulse can be made close to those of the quasi-periodic stationary pulse. Particularly, if the compression ratio is set larger, Gaussian function is utilized and if the compression ratio is set smaller, the sech function is utilized thereby to implement the present invention more efficiently. Or in the later approach, in order that nonlinear chirp as down chirp is added in the vicinity of the pulse center, for example, a phase modulator is used to provide chip of almost desired shape, or an optical pulse is made propagate in the anomalous dispersion medium and experience linear down-chirp thereby to have an almost desired shape. With these configurations, the present invention can be realized efficiently.

In a pulse light source including a pulse shaper fabricated based on the present invention, a method for generating an optical pulse as seed pulse includes:, other than the above-described method of generating beat light, a method of generating pulses by performing intensity modulation on continuous light output from a single laser, with use of an external modulator such as an LN modulator or an electoroabsorption modulator; a method of generating pulses by adding a sinusoidal electric signal to a direct modulation DFB laser to bring about gain switching operation; and a method of generating pulses from a mode-lock laser such as a semiconductor cavity laser, a fiber-ring laser and a laser having any other cavity structure.

Applications of an optical pulse output from a pulse shaper fabricated based on the present invention include, in addition to a signal source, clock light and the like in optical communications, laser machining using ultra-short pulses having FWHM of femtosecond order, and highly accurate measurement using ultra wideband such as an optical sampling oscilloscope and an optical coherence tomography (OCT).

Figure 30:
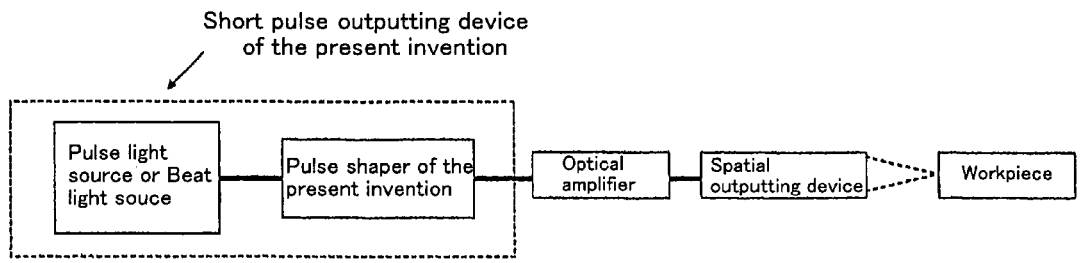
FIG. 30 is a schematic diagram of a laser machining device using an optical pulse outputting device of the present invention.

FIG. 30 is a schematic diagram illustrating a laser machining device using a pulse outputting device of the present invention. Pulse light output from the short pulse outputting device (pulse light source) of the present invention is amplified by an optical amplifier to have high power and emitted to a workpiece via a spatial outputting device such as lens. The short pulse light emitted to the workpiece is processed, for example, in a two-photon absorption process thereby to realize machining.

Figure 31:
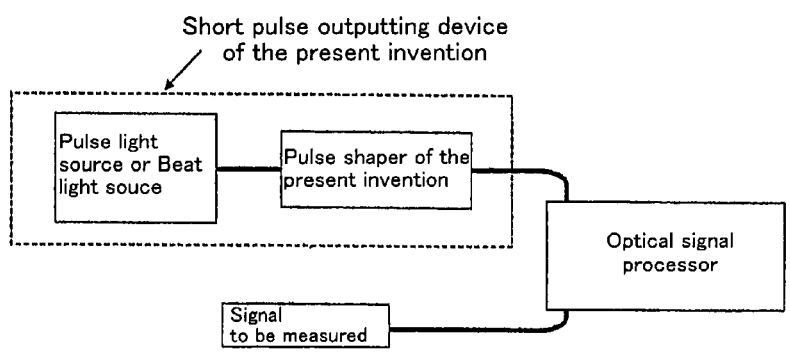
FIG. 31 is a schematic diagram of an optical sampling oscilloscope as highly accurate measurement device using an optical pulse outputting device of the present invention.

FIG. 31 is a schematic diagram illustrating an optical sampling oscilloscope as highly accurate measurement device using a pulse outputting device of the present invention. Pulse light output from the short pulse outputting device (pulse light source) of the present invention is input to an optical signal processor together with a signal to be measured. In the optical signal processor, the signal to be measured and the pulse light are combined, for example, by a coupler. Then, the nonlinear effect in the optical fiber is used to obtain logical addition of the two light waves, and the intensity of the obtained light is output as an electric signal. This process is repeated on the time axis thereby to enable optical sampling.

Figure 32:
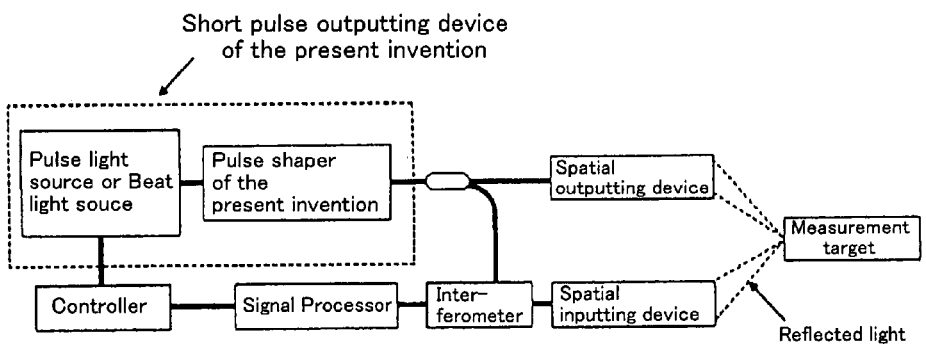
FIG. 32 is a schematic diagram of an optical coherence tomography as highly accurate measurement device using an optical pulse outputting device of the present invention.

FIG. 32 is a schematic diagram illustrating an optical coherence tomography as a highly accurate measurement device using a pulse outputting device of the present invention. Pulse light output from the short pulse outputting device (pulse light source) of the present invention, output time of which is controlled by controller, is divided into two by a coupler, and one is emitted to a measurement target via a spatial outputting device such as lens. Reflected light from the measurement target is made to pass through a spatial inputting device such as lens and is input to an interferometer together with the other divided light. An output from the interferometer is input to a signal processor controlled by a controller. The signal processor performs analogue to digital conversion on the output signal from the interferometer, and the digitalized signal is analyzed to obtain fault information of the measurement target.

The invention claimed is:

1. A method for designing an optical pulse shaper including a first optical propagation line unit having a nonlinear medium and a dispersion medium concatenated, comprising:
specifying design specifications of the first optical propagation line unit; and
based on the design specification, calculating a quasi-periodic stationary pulse of which a waveform of an input optical pulse to the first optical propagation line unit is similar to a waveform of an output pulse from the first optical propagation line unit.

2. The method of claim 1, wherein a second or a second and later optical propagation line units are subsequently concatenated to the first optical propagation line unit.

3. The method of claim 2, further comprising:
specifying design specifications of the second or the second and later optical propagation line units.

4. The method of any one of claims 1 to 3, wherein the design specifications include at least a nonlinear coefficient, a dispersion value and a length in a light propagation direction of each of the nonlinear medium and the dispersion medium of each of the optical propagation line units and a power peak of the input optical pulse.

5. The method of claim 4, wherein provided that generalized dispersion values of the nonlinear medium and the dispersion medium included in the first optical propagation line unit are $s_1$ and $s_2$, respectively, and normalized lengths of the nonlinear medium and the dispersion medium are $K_1$ and $L_1$, respectively, $s_2$ is a value of anomalous dispersion and satisfies a following equation and the values of $K_1$ and $L_1$ satisfy a following equation:

$$0 \leq |s_1| \ll 1 \ll s_2$$

$$L_1 \ll K_1$$

in which $|s_1|$ is an absolute value of $s_1$.

6. The method of claim 5, wherein provided that generalized dispersion values of the nonlinear medium and the dispersion medium included in the nth optical propagation line unit (n is a positive integer equal to or more than 2) counting from the optical propagation line unit among the optical propagation line units are $s_{1n}$ and $s_{2n}$, respectively, and normalized lengths of the nonlinear medium and the dispersion medium are $K_n$ and $L_n$, respectively, $s_{2n}$ is a value of anomalous dispersion and satisfies a following equation and the values of $K_n$ and $L_n$ satisfy following equations:

$$s_{1n} = s_1/\alpha^{n-1}$$

$$s_{2n} = s_2/\alpha^{n-1}$$

$$K_n = K_1/\alpha^{n-1}$$

$$L_n = L_1/\alpha^{n-1}$$

$\alpha$: a compression ratio.

7. The method of claim 5, wherein provided that generalized dispersion values of the nonlinear medium and the dispersion medium included in the nth optical propagation line unit (n is a positive integer equal to or more than 2) counting from the optical propagation line unit among the optical propagation line units are $s_{1n}$ and $s_{2n}$, respectively, and normalized lengths of the nonlinear medium and the dispersion medium are $K_n$ and $L_n$, respectively, $s_{2n}$ is a value of anomalous dispersion and satisfies a following equation and the values of $K_n$ and $L_n$ satisfy following equations:

$$s_{1n} s_1/\alpha^{n-1}$$

$$s_{1n} = s_2$$

$$K_n = K_1/\alpha^{n-1}$$

$$L_n = L_1 \alpha^{2(n-1)}$$

$\alpha$: a compression ratio.

8. The method of claim 1, wherein the input optical pulse is an optical pulse having a waveform close to a waveform of the quasi-periodic stationary pulse.

9. The method of claim 1, wherein provided that the nonlinear coefficient and a loss coefficient of the nonlinear medium are $\nu$ and $\delta$ respectively, the nonlinear medium is a highly nonlinear medium with the values of $\nu$ and $\delta$ satisfying a following equation:

$$z = -(\tfrac{1}{2}\delta) ln(1 - 2\delta/a_0^2 \nu) \zeta$$

z: a total length in the light propagation direction of the nonlinear medium in the optical pulse shaper, expressed by a real distance $\zeta$: a total length in the light propagation direction of the nonlinear medium in the optical pulse shaper, expressed by a normalized distance of dimensionless amount $a_0$: a power attenuation coefficient of an input end of an optical pulse of the nonlinear medium ln: logarithm natural.

10. The method of claim 1, wherein the nonlinear medium is a highly nonlinear optical fiber and the dispersion medium is a single mode optical fiber.

11. An optical pulse shaper designed based on the method of claim 1.

12. The optical pulse shaper of claim 11, wherein a nonlinear phase shift amount of a pulse generated per step is O(1).

13. The optical pulse shaper of claim 11, wherein the length of the nonlinear medium is set in consideration of a propagation loss of the nonlinear medium and the dispersion medium and a connection loss including a connection loss of different media.

14. The optical pulse shaper of claim 11, wherein an optical amplifier is inserted at a given portion so as to compensate power loss due to a propagation loss of the nonlinear medium and the dispersion medium and a connection loss including a connection loss of different media.

15. The optical pulse shaper of claim 11, wherein a pulse light source, an optical amplifier and a band pass filter are sequentially concatenated to reduce a noise in input light.

16. The optical pulse shaper of claim 11, wherein two members each having a DFB laser diode, an optical amplifier and a band pass filter sequentially concatenated are used to generate beat light and the beat light is input the optical pulse shaper.

17. The optical pulse shaper of claim 11, wherein a polarization-maintaining fiber is used.

18. The optical pulse shaper of claim 11, wherein used as the nonlinear medium is a photonic crystal fiber.

19. The optical pulse shaper of claim 11, wherein used as the dispersion medium is a fiber Bragg grating.

20. The optical pulse shaper of claim 11, wherein used as the dispersion medium is a high-order mode fiber.

21. A pulse outputting device comprising the optical pulse shaper of claim 11.

22. A laser machining device comprising the optical pulse shaper of claim 11.

23. A measurement device comprising the optical pulse shaper of claim 11.

24. An optical sampling oscilloscope comprising the optical pulse shaper of claim 11.

* * * * *